(12) United States Patent
Igarashi

(10) Patent No.: US 8,063,917 B2
(45) Date of Patent: Nov. 22, 2011

(54) IMAGE PROCESSING SYSTEM AND PROGRAM

(75) Inventor: Takeo Igarashi, Tokyo (JP)

(73) Assignee: The University of Tokyo, Tokyo (JP)

( * ) Notice: Subject to any disclaimer, the term of this patent is extended or adjusted under 35 U.S.C. 154(b) by 495 days.

(21) Appl. No.: 11/909,588

(22) PCT Filed: Mar. 30, 2006

(86) PCT No.: PCT/JP2006/306727
§ 371 (c)(1),
(2), (4) Date: Feb. 17, 2009

(87) PCT Pub. No.: WO2006/106863
PCT Pub. Date: Oct. 12, 2006

(65) Prior Publication Data
US 2009/0213143 A1    Aug. 27, 2009

(30) Foreign Application Priority Data

Apr. 1, 2005  (JP) ................................. 2005-106371

(51) Int. Cl.
*G09G 5/00* (2006.01)
*G06T 15/30* (2011.01)
*G06T 15/00* (2011.01)
(52) U.S. Cl. .......................... 345/647; 345/419; 345/423
(58) Field of Classification Search .................. 345/420, 345/643, 647, 473, 423
See application file for complete search history.

(56) References Cited

U.S. PATENT DOCUMENTS

| 6,765,589 | B1 | 7/2004 | Georgiev et al. | |
| 7,567,263 | B2* | 7/2009 | Georgiev et al. | 345/647 |
| 2004/0075659 | A1* | 4/2004 | Taubin | 345/428 |
| 2006/0268015 | A1* | 11/2006 | Georgiev et al. | 345/647 |
| 2006/0290693 | A1* | 12/2006 | Zhou et al. | 345/420 |
| 2006/0290695 | A1* | 12/2006 | Salomie | 345/420 |
| 2007/0035541 | A1* | 2/2007 | Isner et al. | 345/420 |
| 2008/0043021 | A1* | 2/2008 | Huang et al. | 345/428 |
| 2009/0002376 | A1* | 1/2009 | Xu et al. | 345/473 |

FOREIGN PATENT DOCUMENTS

| JP | 06-282614 | 10/1994 |
| JP | 10-69549 | 3/1998 |

OTHER PUBLICATIONS

"Laplacian Surface Editing", Orga Solkine et al., EurographicslACM SIGGRAPH Symposium, 179-188, [online], Jul. 9, 2004, [searched on Feb. 23, 2005], the Internet <URL: http://www-sop.inria.fr/geometrica/events/sgp2004/program.html>.

(Continued)

*Primary Examiner* — Chante Harrison
(74) *Attorney, Agent, or Firm* — Griffin & Szipl, P.C.

(57) ABSTRACT

An object can be deformed in a remarkably short processing time. The image processing system (10) comprises: a first mesh creating section (36) for creating data on such an intermediate triangular mesh that the secondary error metric representative of the difference between an original triangular mesh and a processed intermediate triangular mesh is minimized for a triangular mesh of original shape while allowing rotation and enlargement/contraction thereof according to information about a plurality of handle positions including the points to be fixed and moved in the triangular mesh: and a second mesh creating section (38) for creating the data on such a final triangular mesh that the error metric representative of the difference between the intermediate triangular mesh and the final triangular mesh is minimized while allowing rotation and translation of the intermediate triangular mesh but not allowing uneven distortion, stretching and enlargement/contraction thereof.

15 Claims, 13 Drawing Sheets

OTHER PUBLICATIONS

International Search Report issued in corresponding application No. PCT/JP2006/306727, completed Apr. 20, 2006 and mailed May 2, 2006.

PCT/IB/338 and English translation of the International Preliminary Report on Patentability issued in corresponding application No. PCT/JP2006/306727.

* cited by examiner

IMAGE PROCESSING SYSTEM AND PROGRAM

This is a National Phase Application in the United States of International Patent Application No. PCT/JP2006/306727 filed Mar. 30, 2006, which claims priority on Japanese Patent Application No. 2005-106371, filed Apr. 1, 2005. The entire disclosures of the above patent applications are hereby incorporated by reference.

TECHNICAL FIELD

The present invention relates to an image processing apparatus and image processing program that can freely deform a displayed object.

BACKGROUND ART

The technologies have been proposed for operating, for example, moving, rotating, expanding/contracting or bending a two-dimensional object in an image in accordance with an instruction by a user. Conventionally, for such an operation, an object in an image is divided by triangle meshes, and the object is deformed by deforming the meshes.

The application of a predefined skeleton has been known as a method for operating a form. When a user operates the form of the skeleton, an image processing system adjusts the entire form in accordance with the form of the operated skeleton. However, defining the skeleton form is not easy processing and is not effective for an object without a clear skeleton structure, such as an amoeba, which is a problem.

Free Form Deformation (FFD) is another publicly known method. A user divides a space into multiple domains and operates a domain by moving a control point, which defines each domain. However, setting FFD takes time, and a user must manually operate many vertices, which is a problem.

[Non-Patent Document 1] "Laplacian Surface Editing", Orga Solkine et al., Eurographics/ACM SIGGRAPH Symposium, 179-188, [online], Jul. 9, 2004, [searched on Feb. 23, 2005], the Internet <URL: http://www-sop.inria.fr/geometrica/events/sgp2004/program.html>

DISCLOSURE OF THE INVENTION

Problems that the Invention is to Solve

Non-Patent Document 1 proposes a method of creating a new triangle mesh by scaling up/down and/or rotating each of triangle meshes forming a two-dimensional object and causing to display the two-dimensional object based on the new triangle mesh.

Also in this case, a system and/or program are desired by which the deformation of an object is natural and the processing time is short.

It is an object of the invention to provide an image processing system and image processing program by which an object can be naturally deformed and the processing time is significantly short.

Means for Solving the Problems

The invention provides a method for operating a form without using a skeleton or FFD. A user defines multiple points within an object as handles and moves the handles to desired positions.

Next, the image processing system minimizes the local distortion of a form and deforms the entire form based on given positions of the handles. In the method according to the invention, the form of an object can be naturally deformed, and, in comparison with a conventional method that distorts the space itself in which an object is embedded, the processing result, that is, the movement of an object is close to the behavior of the object in the real world.

According to the invention, for the minimization of the distortion, an algorithm including two closed steps (which provide a result by performing a series of calculations without repetitive operations) are basically provided in order to find the construction of a form. In a conventional method, a physical simulation or non-linear optimization has been applied. However, the method is slow with interactive operations (interactions) with a user.

The key issue is to formulate the problem of the minimization as linear simultaneous equations by designing a quadratic error metric properly. The image processing system can find a solution by the single multiplication of matrices by solving the simultaneous equations at the beginning of the interaction. Though a single quadratic error function is ideally provided that handles all attributes of a form, it is difficult to design such a single error function. Accordingly, the invention divides the problem of the minimization into the problem of rotational direction and the problem of size. Thus, according to the invention, the problems are broken down to two minimization problems of least square approximation, which are solved sequentially.

More specifically, the object of the invention is achieved by an image processing system having a storage device storing original form data including the data of a triangle mesh constructing an object to be deformed, the system including:

first mesh creating means for loading the original form data from the storage device based on the information describing multiple handle positions including a fixed point and a movable point on the triangle mesh on the image from the input device, creating intermediate mesh data including the data of an intermediate triangle mesh that provides the minimum of the quadratic error metric expressing the difference between the original triangle mesh and the processed intermediate triangle mesh under the state allowing the rotation and expansion/contract of the original triangle mesh described by the original form data, and storing the intermediate mesh data in the storage device; and second mesh creating means for creating final mesh data including the data of a final triangle mesh that provides the minimum of the error metric expressing the difference between the intermediate triangle mesh and the final triangle mesh under the state allowing the rotation and parallel movement of the intermediate triangle mesh described by the intermediate mesh data and not allowing uneven distortion, expansion/contract and scale-up/down, and storing the final mesh data in the storage device.

According to a preferred embodiment, the second mesh creating means:

rotates and moves in parallel the original triangle mesh described by the original form data, creates a fitted mesh data including the data of a fitted triangle mesh that provides the minimum of the quadratic error metric from the corresponding intermediate triangle mesh described by the intermediate mesh data, and stores the fitted mesh data in the storage device; and creates final mesh data including the data of a final triangle mesh that provides the minimum of the quadratic error metric expressing the difference in vector, which expresses a side of a triangle, between the triangle mesh described by the fitted mesh data and the corresponding final triangle mesh and stores the final mesh data in the storage device.

According to another preferred embodiment, the image processing system further includes image creating means for loading original form data or final mesh data stored in the storage device and creating an image including the object based on the loaded data.

According to a more preferred embodiment, the image processing system further includes:

registration means for, after original form data is stored in the storage device, (a) calculating, based on the vertex coordinates of the original triangle mesh described by the original form data:

a matrix $G^{step1}$ satisfying:

$$E^{step1}\{v\} = v^T G^{step1} v; \text{ and}$$

a matrix $G^{step2}$ satisfying:

$$E^{step2}\{v\} = v^T G^{step2} v$$

(where $E^{step1}$ is a function expressing the quadratic error metric in the first mesh creating means, which is expressed by a quadratic expression by 2n variables v0x, v0y, v1x, v1y, . . . , vnx, and vny, and $E^{step2}$ is a function expressing the quadratic error metric expressing the difference between the triangle mesh described by fitted mesh data and the final triangle mesh in the second mesh creating means, which is expressed by a quadratic expression by 2n variables v0x, v0y, v1x, v1y, . . . , vnx, and vny); and (b) calculating:

a matrix $G^{fitting}$ and the inverse matrix $G^{fitting-1}$ of the matrix $G^{fitting}$ satisfying:

$$\nabla E^{fitting}\{w\} = G^{fitting} w + B^{fitting} = 0$$

(where $E^{fitting}$ is a function expressing a quadratic error metric expressing the difference between the triangle mesh described by the original form data and an intermediate triangle mesh in the second mesh creating means; and compilation means for, after a handle is placed or added at a position or deleted from a position in accordance with information from the input device, (c) calculating:

a matrix $G^{step1'}$ and a matrix $G^{step2'}$ by removing the component of the vertex constrained by the handle regarding the $G^{step1}$ and $G^{step2}$; and (d) calculating the inverse matrices $G^{step1'-1}$ and $G^{step2'-1}$ of the matrices $G^{step1'}$ and $G^{step2'}$.

According to a further preferred embodiment, after a handle at a position is moved in accordance with information from the input device, the first mesh creating means:

(e) calculates a vector $B^{step1}$ by using the updated position of the vertex constrained in a triangle mesh accompanying with the movement of the handle (where $\nabla E^{step1}\{u\} = G^{step1'} + B^{step1} = 0$, and $\nabla E^{step1}\{v\}$ is a partial differential of $E^{step1}\{v\} = v^T G^{step1} v$; and (f) multiplies the matrix $G^{step1'-1}$ by the $B^{step1}$ to create intermediate mesh data of the intermediate mesh triangle including the coordinates relating to a free vertex in a triangle mesh; and the second mesh creating means:

(g) calculates the vector $B^{fitting}$ based on the intermediate mesh data;

(h) multiplies the matrix $G^{fitting-1}$ by $B^{fitting}$ to create the fitted mesh data of the fitted triangle;

(i) calculates a vector $B^{step2'}$ based on the fitted mesh data (where $\nabla E^{step2}\{u\} = G^{step2'} u + B^{step2'} = 0$, and: $\nabla E^{step2}\{v\}$ is a partial differential of $E^{step2}\{v\} = v^T G^{step2} v + B^{step2} v$; and (j) multiplies the matrix $G^{step2'-1}$ by $B^{step2'}$ to create the final mesh data of the final triangle mesh.

According to one preferred embodiment, the object to be deformed is a two-dimensional object including the triangle mesh. Alternatively, the object to be deformed may be a curved line. In this case, the system further includes initial triangle mesh creating means for creating a triangle mesh formed by connecting three neighboring points of the vertices included in a polyline expressing the curved line from the data of the polyline, and storing the data of the triangle mesh in the storage device. The object of the invention is further achieved by an image processing program readable by a computer having a storage device storing original form data including the data of a triangle mesh constructing an object to be deformed, the program causing the computer to perform:

a first mesh creating step of loading the original form data from the storage device based on the information describing multiple handle positions including a fixed point and a movable point on the triangle mesh on the image from the input device, creating intermediate mesh data including the data of a intermediate triangle mesh that provides the minimum of the quadratic error metric expressing the difference between the original triangle mesh and the processed intermediate triangle mesh under the state allowing the rotation and expansion/contract of the original triangle mesh described by the original form data, and storing the intermediate mesh data in the storage device; and a second mesh creating step of allowing the rotation and parallel movement of the intermediate triangle mesh described by the intermediate mesh data, creating final mesh data including the data of a final triangle mesh that provides the minimum of the error metric expressing the difference between the intermediate triangle mesh and the final triangle mesh without allowing uneven distortion, expansion/contract and scale-up/down, and storing the final mesh data in the storage device.

According to a preferred embodiment, the image processing program causes the computer to perform, in the second mesh creating step, the steps of:

rotating and moving in parallel the original triangle mesh described by the original form data, creating a fitted mesh data including the data of a fitted triangle mesh that provides the minimum of the quadratic error metric from the corresponding intermediate triangle mesh described by the intermediate mesh data, and storing the fitted mesh data in the storage device; and creating final mesh data including the data of a final triangle mesh that provides the minimum of the quadratic error metric expressing the difference in vector, which expresses a side of a triangle, between the triangle mesh described by the fitted mesh data and the corresponding final triangle mesh and storing the final mesh data in the storage device.

According to another preferred embodiment, the image processing program further causes the computer to perform an image creating step of loading original form data or final mesh data stored in the storage device and creating an image including the object based on the loaded data.

According to a more preferred embodiment, the image processing program further causes the computer to perform the steps of:

after original form data is stored in the storage device, (a) calculating, based on the vertex coordinates of the original triangle mesh described by the original form data:

a matrix $G^{step1}$ satisfying:

$$E^{step1}\{v\} = v^T G^{step1} v; \text{ and}$$

a matrix $G^{step2}$ satisfying:

$$E^{step2}\{v\} = v^T G^{step2} v$$

(where $E^{step1}$ is a function expressing the quadratic error metric in the first mesh creating means, which is expressed by a quadratic expression by 2n variables v0x, v0y, v1x, v1y, . . . , vnx, and vny, and $E^{step2}$ is a function expressing the quadratic error metric expressing the difference between the triangle mesh described by fitted mesh data and the final triangle mesh in the second mesh creating means, which is expressed by a quadratic expression by 2n variables v0x, v0y, v1x, v1y, ..., vnx, and vny); and (b) calculating:

a matrix $G^{fitting}$ and the inverse matrix $G^{fitting-1}$ of the matrix $G^{fitting}$ satisfying:

$$\nabla E^{fitting}\{w\} = G^{fitting}w + B^{fitting} = 0$$

(where $E^{fitting}$ is a function expressing a quadratic error metric expressing the difference between the triangle mesh described by the original form data and an intermediate triangle mesh in the second mesh creating means; and further causing the computer to perform the steps of:

after a handle is placed or added at a position or deleted from a position in accordance with information from the input device, (c) calculating:

a matrix $G^{step1'}$ and a matrix $G^{step2'}$ by removing the component of the vertex constrained by the handle regarding the $G^{step1}$ and $G^{step2}$; and (d) calculating the inverse matrices $G^{step1'-1}$ and $G^{step2'-1}$ of the matrices $G^{step1'}$ and $G^{step2'}$.

According to a further preferred embodiment, after a handle at a position is moved in accordance with information from the input device, the image processing program causes the computer to perform, in the first mesh creating step, the steps of:

(e) calculating a vector $B^{step1}$ by using the updated position of the vertex constrained on a triangle mesh accompanying with the movement of the handle
(where $\nabla E^{step1}\{u\} = G^{step1'} + B^{step1} = 0$, and $\nabla E^{step1}\{v\}$ is a partial differential of $E^{step1}\{v\} = v^T G^{step1} v$; and (f) multiplying the matrix $G^{step1'-1}$ by the $B^{step1}$ and creating intermediate mesh data of the intermediate mesh triangle including the coordinates relating to a free vertex in a triangle mesh; and the program causes the computer to perform, in the second mesh creating step, the steps of:

(g) calculating the vector $B^{fitting}$ based on the intermediate mesh data;

(h) multiplying the matrix $G^{fitting-1}$ by $B^{fitting}$ to create the fitted mesh data of the fitted triangle;

(i) calculating a vector $B^{step2'}$ based on the fitted mesh data (where $\nabla E^{step2}\{u\} = G^{step2'}u + B^{step2'} = 0$, and;
$\nabla E^{step2}\{v\}$ is a partial differential of $E^{step2}\{v\} = v^T G^{step2} v + B^{step2} v$; and (j) multiplying the matrix $G^{step2'-1}$ by $B^{step2'}$ to create the final mesh data of the final triangle mesh.

According to one embodiment, the object to be deformed is a two-dimensional object including the triangle mesh. Alternatively, the object to be deformed may be a curved line, and the program may further cause the computer to perform an initial triangle mesh creating step of creating a triangle mesh formed by connecting three neighboring points of the vertices included in a polyline expressing the curved line from the data of the polyline, and storing the data of the triangle mesh in the storage device.

ADVANTAGE OF THE INVENTION

According to the invention, an image processing system and image processing program can be provided that can naturally deform an object and have a significantly short processing time therefor.

BEST MODE FOR CARRYING OUT THE INVENTION

With reference to the attached drawings, an embodiment of the invention will be described below.

[System Configuration]

FIG. 1 is a block diagram showing a hardware configuration of an image processing system according to an embodiment. As shown in FIG. 1, an image processing system 10 includes an input device 12 such as a mouse and a keyboard, a display device 14, a driver 16 that executes reading/writing from/to a portable storage medium 18 such as a CD and a DVD, a CPU 20, a ROM 22, a RAM 24, and an external storage device 26 such as a hard disk, which are connected to the image processing system 10 through the bus 11. In other words, the image processing system 10 is implemented by installing a computer program including processing steps (which will be described in detail later) to be executed by a generic personal computer to the personal computer.

FIG. 2 is a functional block diagram of the image processing system according to this embodiment. As shown in FIG. 2, the image processing system 10 functionally includes an initial mesh creating section 30, a registration processing section 32, a compilation processing section 34 and a first mesh creating section 36 and a second mesh creating section 38. These functions are implemented mainly by the CPU 20. The image processing system 10 further includes a storage device 40 that stores image data, which will be described later. The function is implemented mainly by the RAM 24. As shown in FIG. 2, the image processing system 10 further includes an interface (I/F) 42 that receives an instruction from the input device and gives the instruction to a component such as the initial mesh creating section 30 or outputs an image based on created data to the display device 14 and an image creating section 52 that renders an object based on data (such as original form data and final mesh data) stored in the storage device 40.

[Outline of Processing]

The initial mesh creating section 30 creates a triangle mesh within an object in a two-dimensional form to be operated by a user in an image. The initial mesh creating section 30 stores the coordinates of the vertices of an obtained mesh to the storage device 40 as original form data 44. The processing by the initial mesh creating section 30 is conventionally known, and the processing is not a part of the invention.

An object in a two-dimensional form may be a vector graphics or a bitmap image. The object is only required to be a two-dimensional polygon with a closed boundary. When an image is a bitmap image, the image can be handled as a polygon with a closed boundary by deleting the background and tracing the outer edge in advance. The initial mesh creating section 30 creates a triangle mesh within a polygon with a closed boundary and stores the data of the coordinates of the vertices in the storage device 40 as original form data 44. Various methods have been known for creating a triangle mesh. According to this embodiment, substantially equilateral triangles are desirably created all over the area of a polygon with a closed boundary. The initial mesh creating section 30 repetitively corrects a mesh by adjusting the positions of the vertices and connections of the mesh by handling a constrained Delaunay triangulation as a base point. The data of the resulting final mesh is to be used in the future processing as the original form data 44.

[Upstream Processing]

A registration processing section 32 and a compilation processing section 34 perform upstream processing of the processing in the first mesh creating section 36 and the second mesh creating section 38, which will be described in detail. The registration processing section 32 performs necessary processing when a user operates the input device 12 to create a mesh in an object in a two-dimensional form displayed on the screen of the display device 14. The compilation processing section 34 performs necessary processing when a handle is placed, added or deleted.

In this specification, a handle can be defined by operating a mouse to click on a displayed two-dimensional form by a user. Here, the image processing system 10 stores the coordinates of the handle in the storage device 40. Under the state that a handle has been defined, or by selecting a handle and dragging a mouse by a user, the handle can be moved. Accompanying with the movement of the handle, the system may update the coordinates of the handle stored in the storage device 40. Notably, the processing to be performed in the image processing system 10 when a handle is placed, added or deleted is different from the processing to be performed in the image processing system 10 when a handle is moved. This will be described in detail again with reference to the flowcharts in FIGS. 8 and 9.

Performing processing by a system in response to the setting of a handle or movement of a handle by a user is called "interaction". Deforming an object in a two-dimensional form by setting or moving a handle by a user is called "manipulation".

A user places one or more handles on a form and moves the handles interactively (refer to the signs (b) and (c) in FIG. 3). When a mouse is used, a user places and clicks on an icon at a desired position on a form to define a handle and to move the defined handle by dragging.

Presently, according to the invention, a user can place a handle at an arbitrary position to deform a mesh structure so as to include the handle.

First, a triangle mesh is applied to the manipulation of a form. Next, the system maps an original line and image to the mesh deformed from the original mesh.

In order to operate a vector graphics, barycentric coordinates of the vertices of a corresponding triangle of a mesh. In order to operate a bitmap image, simple linear mapping is used.

The image processing system performs additional upstream processing (sign (b) in FIG. 3) when a new handle is added or a handle is deleted. The processing is called "compilation". The processing obtains, as input, the configuration of a handle, that is, the information describing which is the vertex defined as a handle and returns, as output, a function for returning the form of the processing result (or the function for returning the position of the remaining vertices of a mesh when the coordinates of a handle is received). During the interaction, the image processing system 10 transmits the configuration of the updated handle to the function.

[Outline of Mesh Creation]

According to this embodiment, the mesh creation is implemented by performing processing sequentially by the two of the first mesh creating processing section 36 and second mesh creating processing section 38. In the mesh creation, the input to the algorithm is the x-y coordinates of a constrained mesh vector (refer to the sign a in FIG. 4), and the output is the coordinates of remaining free vertices (refer to the sign d in FIG. 4) excluding the constrained vertices which minimizes the distortion relating to the processed mesh triangles. The main problem is how the distortion of the triangle is defined. According to this embodiment, a quadratic error metric is designed in free variables, and the problem of the minimization is solved by a simple matrix operation.

In the first mesh creating processing section 36, intermediate mesh data 46 (refer to the sign b in FIG. 4), which is an intermediate result, is created by minimizing the error metric by which the distortion or unevenness avoids the expansion/contract and allows the rotation and scale-up/down when the coordinates of a constrained vertex are given. The created intermediate mesh data 46 is stored in the storage device 40.

The subsequent processing in the second mesh creating processing section 38 is broken down to two consecutive processes. The second mesh creating processing section 38 first fits the original triangle (the triangle based on the intermediate mesh data 46 obtained by the first mesh creating processing section 36) further to an intermediate triangle (refer to the sign c in FIG. 4) without changing the scale. The second mesh processing section 38 stores the data relating to the fitted triangle to the storage device 40 as fitted mesh data 48. Next, the second mesh creating processing section 38 calculates the final processing result (refer to the sign d in FIG. 4) that provides the minimum of the error metric expressing the difference between the triangle based on the final processing result (final mesh data 50) and the triangle based on the fitted mesh data 48. The final mesh data 50 obtained in this way is stored in the storage device 40. The object in a two dimensional form is displayed on the screen of the display device 14 as a set of triangle meshes based on the final mesh data 50.

[Processing in First Mesh Creating Section 36]

In the processing by the first mesh creating section 36 according to this embodiment, the intermediate mesh data 46, which is an intermediate result, is created by minimizing the error function that allows the rotation and scale-up/down. The input is the x-y coordinates of a constrained vertex in the original form data 44, which is stored in the storage device 40, and the output is the x-y coordinates of remaining free vertices excluding the constrained vertex.

It should be noted that, in the algorithm according to the invention, a previous result is not used as an initial construction unlike the physical simulation and relaxation methods. According to the invention, the solution in a closed form can be provided.

FIG. 5 is a diagram illustrating the error function in the processing in the first mesh creating section according to this embodiment. In FIG. 5, $v2^{desired}$ can be obtained by fitting an original triangle onto a target triangle such that v0 and v1 can match with v0' and v1' through the parallel movement, rotation and scale-up/down.

In the processing by the first mesh creating section 36, the error function for the triangle {v0, v1, v2} is defined as follows (refer to FIG. 5).

For the corresponding triangle of the triangle (v0', v1', v2') based on the original form data, the first mesh creating section 36 first calculates the relative coordinates $\{x_{01}, y_{01}\}$ of v2' at the local coordinates defined by v0' and v1'.

[EQ1]

$$v_2' = v_0' + x_{01}\overrightarrow{v_0'v_1'} + y_{01}R_{90}\overrightarrow{v_0'v_1'} \quad (1)$$

When v0, v1, x01 and y01 are given, the first mesh creating section 36 can calculate the desired position (which corresponds to $v2^{desired}$) to v2.

$$v_2^{desired} = v_0 + x_{01}\overrightarrow{v_0 v_1} + y_{01} R_{90} \overrightarrow{v_0 v_1} \text{ where} \quad (2)$$

$$R_{90} = \begin{bmatrix} 0 & 1 \\ -1 & 0 \end{bmatrix}$$

The error regarding v2 is expressed as the following equation.

[EQ3]

$$E_{\{v2\}} = |v_2^{desired} - v_2|^2 \quad (3)$$

In the same manner, $v0^{desired}$ and $v1^{desired}$ can be calculated. Thus, the error regarding one triangle can be expressed by the following equation.

$$E_{\{v0,v1,v2\}} = \sum_{i=1,2,3} |v_i^{desired} - v_i|^2 \quad (4)$$

The error to the entire mesh is a total of the errors to all triangles in the mesh. Since the error metric is quadratic in $v^T = \{v_{0x}, v^{0y}, v_{1x}, v_{1y}, \ldots, v_{nx}, v_{ny}\}$ the error can be expressed in a matrix form.

$$E^{step1}\{v\} = v^T G^{step1} v \quad (5)$$

The minimization can be solved with zero (0) as the partial differential $\nabla E^{step1}\{v\}$ based on the free variable $u^T = \{u_{0x}, u_{0y}, u_{1x}, u_{1y}, \ldots, u_{mx}, u_{my}\}$ of the function E.

$$\nabla E^{step1}\{u\} = G^{step1'} + B^{step1} = 0 \quad (6)$$

where $G^{step1'}$ is a matrix of "2 m×2 m" obtained by removing the component relating to the constrained variable of $G^{step1}$, and $B^{step1}$ is a vector in a size "m" obtained from the $G^{step1}$ and a constrained variable. Since $G^{step1'}$ is a fixed value and $B^{step1}$ only changes in the manipulation, "u" can be calculated by simple multiplication of matrices by obtaining the inverse of $G^{step1'}$ at the beginning of the interaction. In reality, the LU decomposition of $G^{step1'}$ is calculated and is stored in the storage device 40. The sign b in FIG. 4 schematically shows the processing result by the first mesh creating section 36. Since the multiplication of a single matrix is only required during the interaction, the speed of computing can be increased.

Based on the equation (5), $E^{step1}$ can be expressed by a quadratic equation of 2n variables of $v_{0x}, v_{0y}, v_{1x} v_{1y}, \ldots, v_{nx}, v_{ny}$.

For example, if a quadratic equation:

$$E^{step1} = a*v_{0x}*v_{0x} + b*v_{0x}*v_{0y} + c*v_{0y}*v_{0y}$$

is given, $G^{Step1}$ can be obtained as follows:

$$Gstep1 = \{a\ b\}\{b\ c\}$$

Referring back to FIG. 4, the image processing system 10 first creates an intermediate result (intermediate mesh data 46) (the sign b in FIG. 4) in FIG. 4 by minimizing the error metric allowing scale-up/down for a given handle configuration (the sign a in FIG. 4). Next, the image processing system 10 fits the triangle based on the original form data 44 to the corresponding triangle in the intermediate result (intermediate mesh data) and obtains the fitted mesh data 48 (the sign c in FIG. 4). Finally, the image processing system 10 creates the final result (final mesh data 50) by minimizing the difference between the fitted triangle and the corresponding triangle in the final result.

[Processing in Second Mesh Creating Section 38]

The second mesh creating section 38 obtains, as input, the intermediate mesh data 46 (x-y coordinates of all vertices) stored in the storage device 40 and returns, as output, the final mesh data 50 (updated x-y coordinates of a free vertices), which is the final result by adjusting the size of triangles in a mesh.

[Creation of Fitted Mesh Data]

The second mesh creating section 38 fits each triangle based on the original form data 44 to the corresponding triangle based on the intermediate mesh data 46. Here, the rotation and parallel movement of a triangle are allowed, but the distortion and uneven expansion/contract and scale-up/down are not allowed (refer to the sign c in FIG. 4). The fitting processing for creating fitted mesh data is as follows.

The problem is to find a new triangle $\{v0, v1, v2\}$ that is congruent to the triangle $\{v0', v1', v2'\}$ when the triangle $\{v0^{intermediate}, v1^{intermediate}, v2^{intermediate}\}$ based on the intermediate mesh data 46 and the corresponding triangle $\{v0', v1', v2'\}$ based on the original form data 44 are given and that minimizes the functions below (refer to FIG. 6). In FIG. 6, the original triangle is fitted to the intermediate triangle by the parallel movement and rotation.

[EQ5]

$$E^{fitting}_{\{v0,v1,v2\}} = \sum_{i=1,2,3} |v_i - v_i^{intermedaite}|^2 \quad (7)$$

Since it is not easy to directly obtain the solution of the equation, the approximation is made by minimizing the error by allowing scale-up/down and adjusting the scale after that. The processing in the first mesh creating section 36 is expressed by using v0 and v1 as v2 as the following equation:

$$v_2 = v_0 + x_{01}\overrightarrow{v_0 v_1} + y_{01} R_{90} \overrightarrow{v_0 v_1} \quad (8)$$

By inserting the equation to the error function, the error function becomes a quadratic expression of four free variables of $w^T = \{v_{0x}, v_{0y}, v_{1x}, v_{1y}\}$. By defining the gradient $\nabla E^{fitting}$ such that the four free variables can be zero (0), $E^{fitting}$ is minimized. The result is simple four simultaneous equations to be solved.

$$\nabla E^{fitting}\{w\} = G^{fitting} w + B^{fitting} = 0 \quad (9)$$

By solving the equation above, the newly fitted triangle $\{v0, v1, v2\}$ that is analogous to the original triangle $\{v0', v1', v2'\}$ can be obtained. Next, by scaling up/down the fitted triangle with a factor of $|v0'-v1'|/|v0-v1|$, the congruent triangle can be obtained. According to this embodiment, the fitting processing is performed on all of the triangles.

The $G^{fitting}$ and $B^{fitting}$ can be calculated in the same manner for $G^{step1}$ and so on. If the $E^{fitting}$ can be obtained by the quadratic expression of $w = \{v0x, v0y, v1x, v1y\}$, $\nabla E^{fitting}$ resulting from the partial differentiation of it with the elements of w can be expressed as equation (9).

For example, when:
$\nabla E^{fitting} = \{dE/V_{0x}, dE/V_{0y}, dE/V_{1x}, dE/V_{1y}\}$
$dE/V_{0x} = a_0*V_{0x} + b_o*V_{0y} + c_o*V_{1x} + d_o*V_{1y} + e_0$
$dE/V_{0y} = a_1*V_{0x} + b_1*V_{0y} + c_1*V_{1x} + d_1*V_{1y} + e_1$
$dE/V_{1y} = a_3*V_{0x} + b_3*V_{0y} + c_3*V_{1x} + d_3*V_{1y} + e_3$,
$G_{fitting} =$
{
{a0, b0, c0, d0}
{a1, b1, c1, d1}
{a2, b2, c2, d2}
{a3, b3, c3, d3}
}
$B_{fitting} = \{e0, e1, e2, e3\}$

[Creation of Final Mesh Data]

Next, the second mesh creating section 38 calculates the final x-y coordinates of the free vertices excluding the constrained vertex to the given x-y coordinates of the constrained vertex (refer to the sign d in FIG. 4) by minimizing the difference between the triangle based on the final mesh data and the triangle based on the fitted mesh data. Here, it should be noted that the fitted mesh data 48 is only used while the intermediate mesh data 46 is not used.

Describing with reference to the single triangle {v0, v1, v2} shown in FIG. 7, the image processing system 10 calculates the difference between an edge vector of a fitted triangle and an edge vector of a target triangle in FIG. 7. When the triangle {v0$^{fitted}$, v1$^{fitted}$, v2$^{fitted}$} based on the fitted mesh data 48 is given, the quadratic error function can be defined by the following equation:

[EQ7]

$$E_{\{v0,v1,v2\}}^{step2} = \sum_{(i,j)\in\{(0,1),(1,2)(2,0)\}} \left|\overrightarrow{v_i v_j} - \overline{v_i^{fitted} - v_j^{fitted}}\right|^2 \quad (10)$$

Here, it should be noted that the error is not a vertex but an edge (vector). In other words, the direction of the fitted triangle is only used here, and the position is ignored.

The processing below is implemented like the first step. The error to all meshes can be expressed in a matrix form.

$$E^{step2}\{v\} = V^T G^{step2} v + B^{step2} v \quad (11)$$

Next, the partial differential $\nabla E_{v(t)}$ based on the free variable u of the function E is defined to zero (0).

$$\nabla E^{step2}\{u\} = G^{step2'} u + B^{step2'} = 0 \quad (12)$$

Since $G^{step2'}$ is a fixed value and $B^{step2'}$ only changes during the manipulation, "u" can be calculated by simple multiplication of matrices by calculating the inverse function of $G^{step2'}$ at the beginning of the interaction. In reality, the LU decomposition of $G^{step2'}$ is calculated and is stored in the storage device 40.

The $G^{step2}$ can be also obtained by the expression transformation based on equation (11) in a manner described above.

[Real Processing]

FIGS. 8 and 9 are flowcharts describing processing to be performed in the image processing system 10 according to this embodiment. The registration processing section 32, compilation processing section 34, first mesh creating section 36 and second mesh creating section 38 in the image processing system 10 load data required for the processing from the storage device 40 and store data created by the processing in the storage device 40.

The initial mesh creating section 30 creates original form data including the coordinates of the vertices of a triangle created within an object by a well-known method and stores it in the storage device 40 (step 801). After the original form data is created, the image creating section 52 loads the data from the storage device 40 and may create an image in which a two-dimensional object based on the original form data is placed on the background, for example (step 802).

After the original form data is newly created, the registration processing section 32 starts and loads the original form data from the storage device 40 and calculates the matrices $G^{step1}$ expressed by equation (5) and $G^{step2}$ expressed by equation (11) based on the coordinates of the vertices (step 803). Next, the registration processing section 32 calculates the matrix $G^{fitting}$ expressed by equation (9) and the inverse matrix $G^{fitting-1}$ of each triangle based on the original form data (step 804). The data of the calculated matrices are stored in the storage device 40. The $G^{step1}$, $G^{step2}$, $G^{fitting}$ and $G^{fitting-1}$ are not calculated again unless new original form data is created and are stored in the storage device 40 and are loaded as required during manipulation such as the placement of a handle through the interaction with a user below.

After a user operates the input device 12 to place a handle in or add or delete a handle to or from a two-dimensional object displayed on the screen of the display device 14 (step 805), the compilation processing section 34 starts in response thereto. The compilation processing section 34 creates the matrix $G^{step1'}$ expressed by equation (6) and the matrix $G^{step2'}$ expressed by equation (12) by removing the component relating to the vertex constrained by the setting of the handle based on the $G^{step1}$ and $G^{step2}$ obtained by step 803 (step 806). Next, the compilation processing section 34 creates the inverse matrices $G^{step1'-1}$ and $G^{step2'-1}$ of the matrices created by step 806 (step 807). The data of the inverse matrices $G^{step1'-1}$ and $G^{step2'-1}$ obtained by step 807 are stored in the storage device 40.

As described above, the $G^{step1'}$ and $G^{step2'}$ are matrices obtained by removing the component constrained by the matrices $G^{step1}$ and $G^{step2}$.

For example, it is assumed that the matrix $G^{step1}$ is expressed as the following.

$G^{step1} =$
{
{a0, b0, c0, d0}
{a1, b1, c1, d1}
{a2, b2, c2, d2}
{a3, b3, c3, d3}
}

$v = \{v_{0x}, v_{0y}, v_{1x}, v_{1y}\}$
In this case, by removing $v_1$,
$G^{step1'} =$
{
{a0, b0}
{a1, b1}
}

Next, when a user operates the input device 12 to move one of the handles (step 900), the operations by the first mesh creating section 36 and second mesh creating section 38 are started. The first mesh creating section 36 creates the vector $B^{step1}$ expressed in equation (6) based on the updated position of a constrained vertex with the movement of the handle (step 901). As expressed in equation (6), data of the intermediate coordinates (that is, the intermediate mesh data 46) can be obtained by the product of the inverse matrix $G^{step1'-1}$ of the matrix $G^{step1'}$ and the $B^{step1}$. Thus, the first mesh creating section 36 loads the $G^{step1'-1}$ calculated in step 806 and stored in the storage device 40 and multiplies it by the vector $B^{step1}$ obtained in step 901 (step 902). The first mesh creating section 36 stores the thus obtained result in the storage device 40 as the intermediate mesh data 46.

After that, the second mesh creating section 38 loads the intermediate mesh data 46 from the storage device 40 and calculates the vector B fitting expressed in equation (9) of each triangle based on the intermediate mesh data 46 (step 903). Here, as expressed in equation (9), by obtaining the product of the inverse matrix $G^{fitting-1}$ of the matrix $G^{fitting}$ and the $B^{fitting}$ and adjusting the scale based on (|v0'−v1'|/|v0−v1|), the coordinates of the fitted triangles (fitted mesh data) can be obtained. Thus, the second mesh creating section 38 loads the $G^{fitting-1}$ created in step 804 and stored in the storage device 40, multiplies it by the $B^{fitting}$ calculated in step 903 and adjusts the scale (step 904). The second mesh creating section 40 stores the thus obtained data in the storage device 40 as the fitted mesh data.

The second mesh creating section 38 further calculates the vector $B^{step2}$ expressed in equation (11) based on the coordinates of the triangles based on the fitted mesh data (step 905).

After that, (by removing the constrained component) based on the vector $B^{step2}$ the vector $B^{step2'}$ is calculated (step 906).

As expressed in equation (12), from the product of the inverse matrix $G^{step2'-1}$ of the matrix $G^{step2'}$ and the $B^{step2'}$, data of the final coordinates (final mesh data 50) can be obtained. Then, the second mesh creating section 38 loads the $G^{step2'-1}$ created in step 807 and stored in the storage device 40, multiplies it by the $B^{step2'}$ calculated in step 905 and obtains the coordinates of the final triangles (step 908). The coordinates of the final triangles are stored in the storage device 40 as the final mesh data 50.

In this way, after the final mesh data 50 is stored in the storage device 40, the image creating section 52 loads the final mesh data 50 and may create an image in which a two-dimensional object based on the original form data is placed on the background, for example, and display it on the screen of the display device 14 (step 908).

After that, when a handle is moved by operating the input device 12 by a user (step 900), the processing in steps 901 to 907 is performed, and the final mesh data is updated and is stored in the storage device 40. Based on the updated final mesh data, the image creating section 52 further creates an image and displays it on the screen of the display device 14. In other words, the processing shown in FIG. 8 is not performed even if a handle is moved. In other words, an object can be properly deformed by performing the creation of the vectors $B^{step1}$, $B^{fitting}$, $B^{step2}$ and $B^{step2'}$ and multiplication of the matrices only.

When a handle is placed, added or deleted, the creation of the matrices $G^{step1'}$ and $G^{step2'}$ and the inverse matrices is performed by the compilation processing section 34. However, the processing by the registration section 32 is not required to perform newly unless the mesh of a new object is created.

In this way, according to this embodiment, the operations involved in the movement of a handle can be reduced. In the processing by the first mesh creating section, intermediate mesh data, which is data of an intermediate triangle mesh providing the minimum of the error metric allowing the rotation and scale-up/down of the triangle mesh, is created and stored. In the processing by the second mesh creating section, data of the final triangle mesh is calculated and stored which provides the minimum of the error function allowing the rotation and parallel movement but not allowing the distortion, uneven expansion/contract and rotation/contract. By deforming a mesh in two stages in this way, the natural deformation of an object can be achieved.

Apparently, the invention is not limited to the embodiment above, and various changes can be made thereto within the scope of the invention described in Claims and are included in the scope of the invention.

For example, according to the embodiment, an operator places, adds, deletes a handle or moves one of handles on an object by using a mouse. For example, in the example shown in FIG. 2, three handles are placed in an object, and an operator deforms the object by moving the right handle further to the right, for example. However, apparently, the placement of a handle can be performed through other input devices, not limiting to a mouse in order to place a handle, for example. For example, a multipoint tracking device is usable. When a multipoint tracking device is used, a user may seize the form of a two-dimensional object directly by both hands with reference to the object displayed on the screen of a display device and manipulate the form.

Different weights may be given to triangle meshes presenting an object, and the local rigidity of the form can thus be controlled. For example, a predetermined amount (10000) of weight may be given to specific one or more triangle meshes and a weight of "1" may be given to other triangle meshes. Thus, the triangle mesh or meshes with the predetermined amount of weight can have rigidity, which makes the deformation by the movement of a handle difficult.

While the invention is applied to the manipulation of a two-dimensional object according to the embodiment, the invention is not limited thereto. The invention is applicable to the manipulation of a three-dimensional object. In this case, in addition to a triangle object (with x-coordinate and y-coordinate), the three-dimensional coordinates including a z-value expressing the depth are given. Though the z-value is "0" initially, the z-values may be given in accordance with a predetermined order of overlap (defining which comes forward) when different meshes overlap during manipulation. Thus, which triangle mesh comes forward can be expressed.

The algorithm of the processing in two stages according to the invention (that is, the processing employing the first mesh creating section and second mesh creating section) is also applicable to the editing of a curved line. Instead of a triangle mesh in a two-dimensional object, a polyline may be input. The invention is made applicable to the editing of a curved line by creating multiple triangle meshes based on the polyline as shown in FIG. 13 by the mesh creating sections in the embodiment.

In other words, as described in FIG. 10A, when a curved line is given (step 1001), the initial mesh creating section 30 divides the curved line into multiple polylines and stores the coordinate data and so on to the storage device 40 (step 1002). Next, the initial mesh creating section 30 creates a triangle connecting consecutive three vertices of the polylines (step 1003) and stores the coordinate data as a triangle mesh in the storage device 40 as the original form data 44 (step 1004). The subsequent processing is the same as the one described with reference to FIGS. 8 and 9. Notably, the original form data desirably includes information (connection information) indicating the coordinates to be connected to form the curved line.

As shown in FIG. 10B, the image creating section 52 loads the final mesh data 50 from the storage device 40 (step 1011), determines which of the coordinates described by the final mesh data 50 are to be connected and creates the curved line (step 1012) in accordance with the connection information and displays it on the screen of the display device 14.

FIG. 11 is a diagram showing examples in which a curved line displayed on the screen of a display device is edited. When the processing in the first mesh creating section and second mesh creating section is performed like the invention, the curved line behaves as if it has rigidity. On the other hand, when the processing in the first mesh creating section is only performed, for example, the curved line expands or contracts freely. In the upper diagram in FIG. 11, a handle (indicated by the human hand in the figure) is moved. The left diagram in FIG. 11 shows a case where the processing by the first mesh creating section is only performed (comparison example) while the right diagram shows a case (implementation example) where the processing by both of the first mesh creating section and the second mesh creating section is performed. In the comparison example, the stretched area increases, and the pushed area decreases. On the other hand, the example applying the invention (implementation example) provides a more natural result.

The "Peeling Interface" is provided such that a user can directly adjust the area to affect during interaction. In the "Peeling Interface", the area to affect increases as a user drags a curved line farther (refer to FIG. 11). Thus, a user is no longer required to specify the area to affect in advance, and the interaction can be more intuitive.

FIG. 12 is a diagram showing an example in which a curved line is edited by using "Peeling Interface". The area to affect increases as a user pulls the curved line farther (from left to right in the figure). A user can also specify an area clearly in advance (refer to the lower left of the figure).

A user can specify an area to affect clearly by placing a pin on a curved line before dragging. However, when a pin is placed, local deformation is only allowed, and a user cannot change the area to affect. Notably, in real processing, the coordinates of a pin may be stored in the storage device 40 by the initial mesh creating section 30 in response to the input by a user, and the coordinates of the pin may be used for processing.

DESCRIPTION OF REFERENCE NUMERALS AND SIGNS

Figure 1:
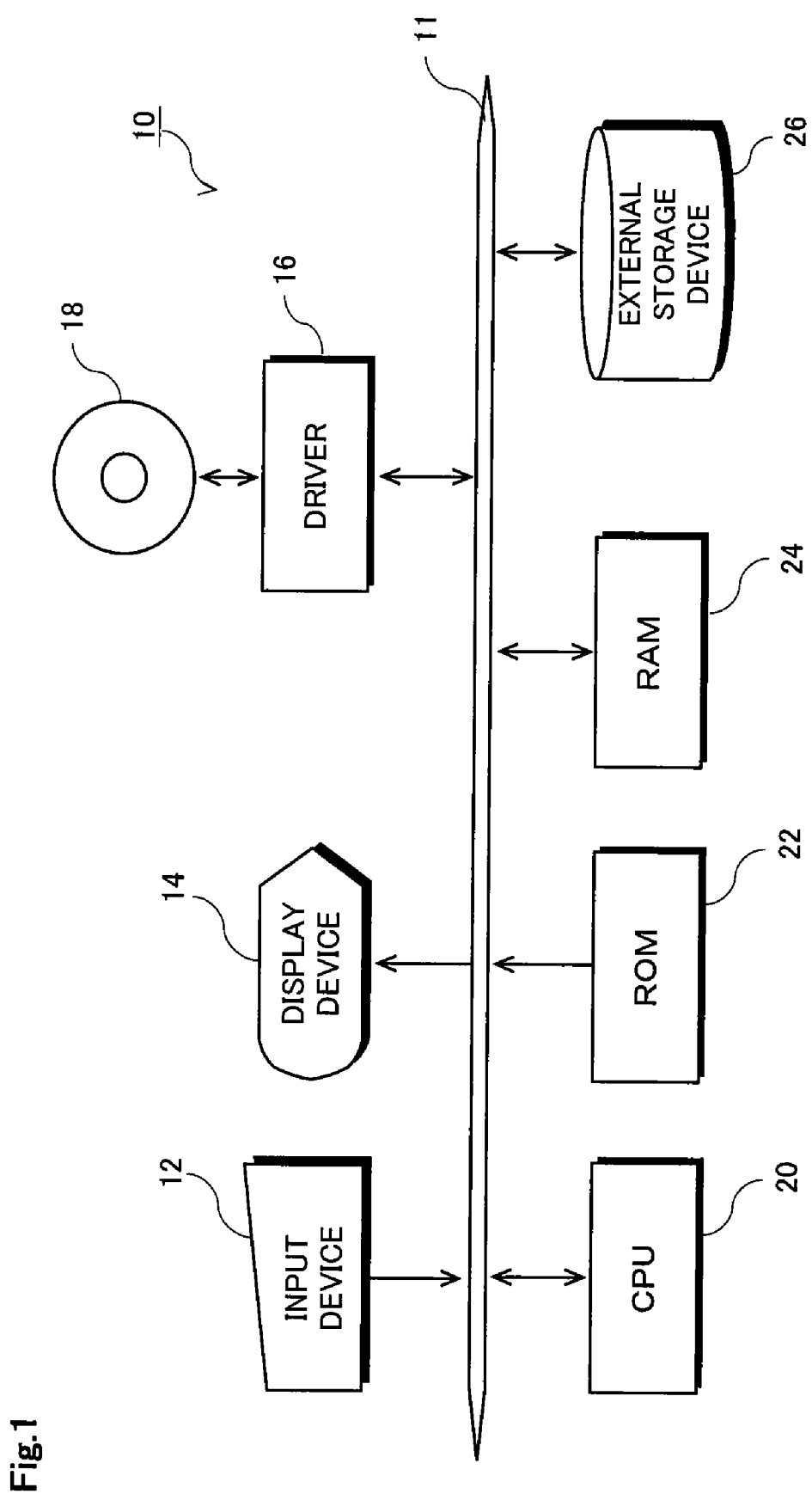
FIG. 1 is a block diagram showing a hardware configuration of an image processing system according to an embodiment.
Figure 2:
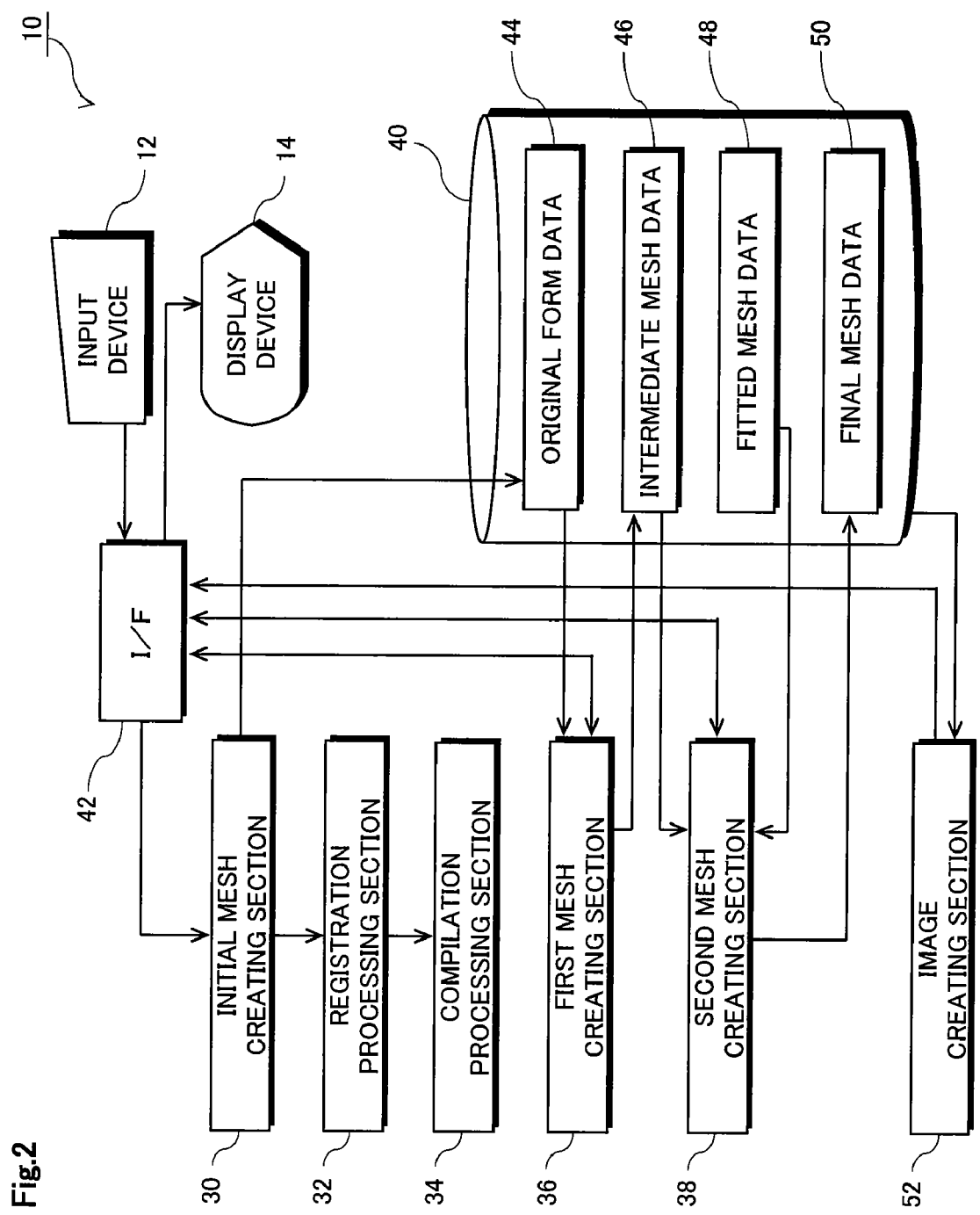
FIG. 2 is a functional block diagram of the image processing system according to the embodiment.
Figure 3:
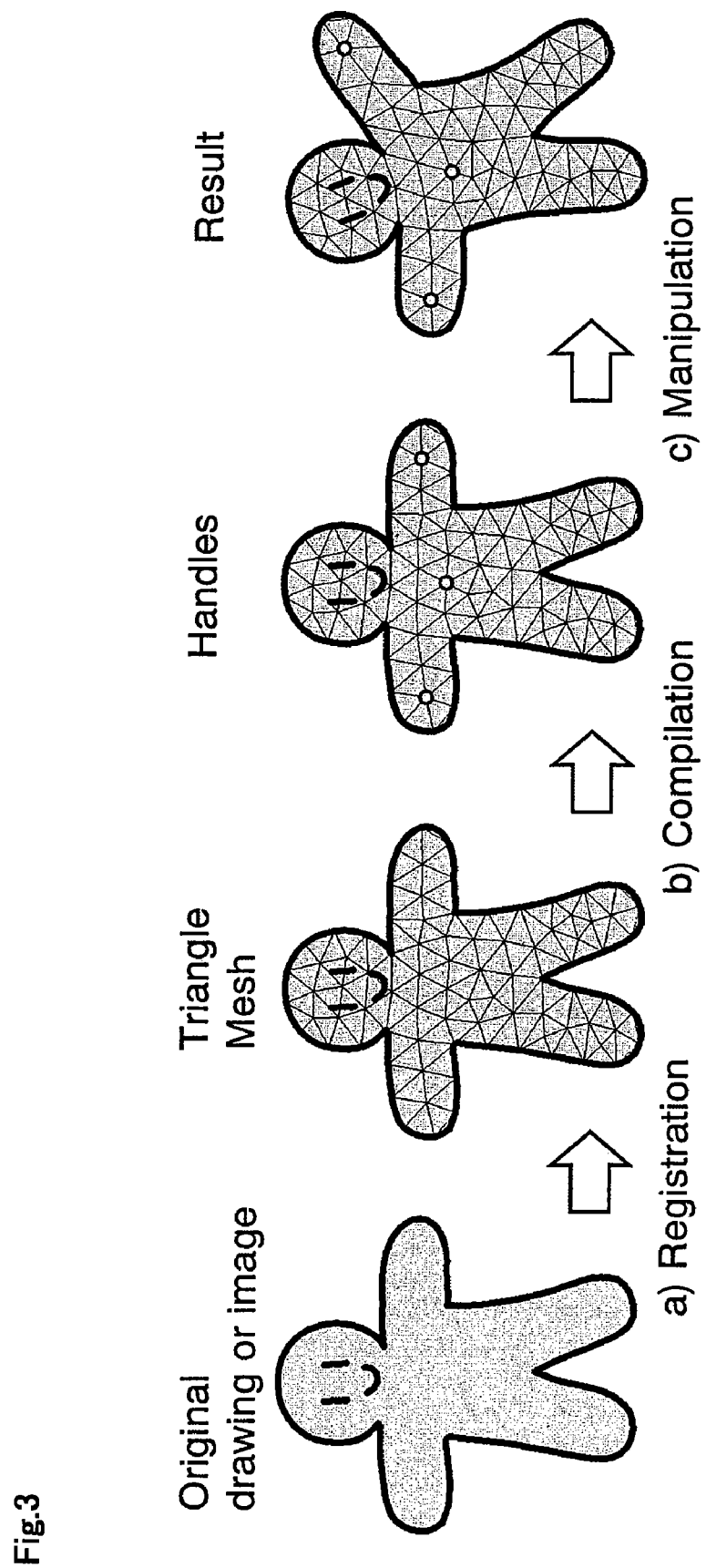
FIG. 3 is a diagram schematically showing processes (registration, compilation and manipulation) by the image processing system according to the embodiment.
Figure 4:
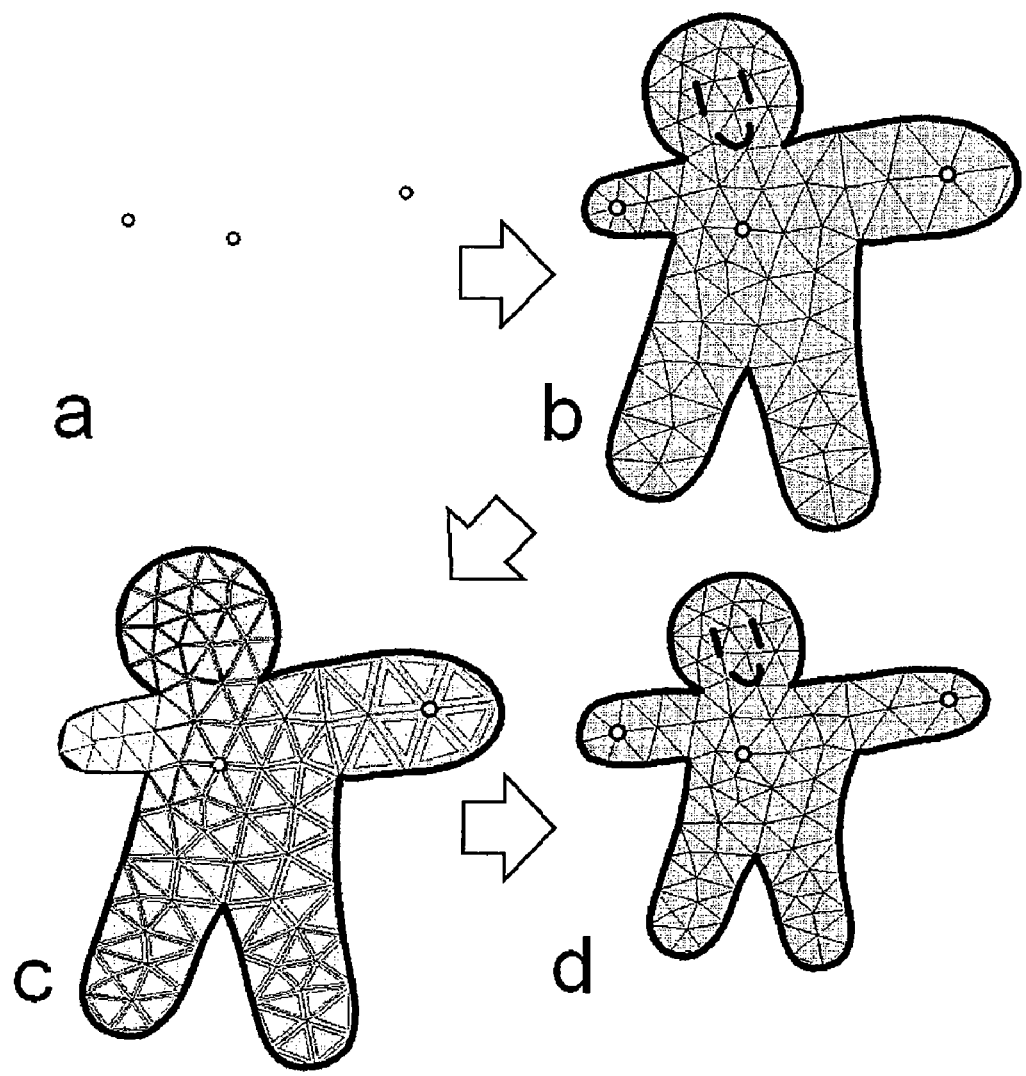
FIG. 4 is a diagram describing the creation of a handle construction, first mesh creation and second mesh creation in two stages by the image processing system according to the embodiment.
Figure 5:
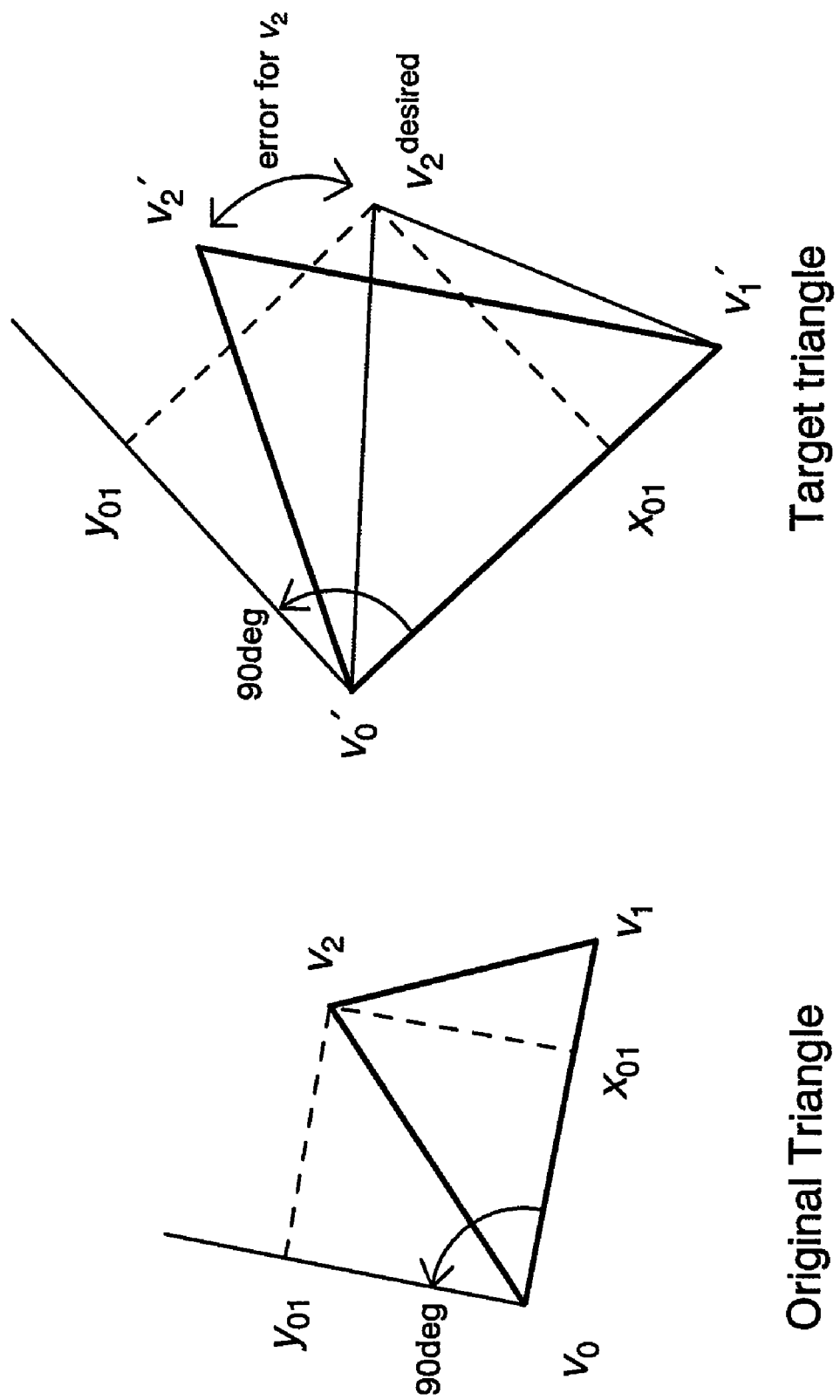
FIG. 5 is a diagram describing an error function in the processing by a first mesh creating section according to the embodiment.
Figure 6:
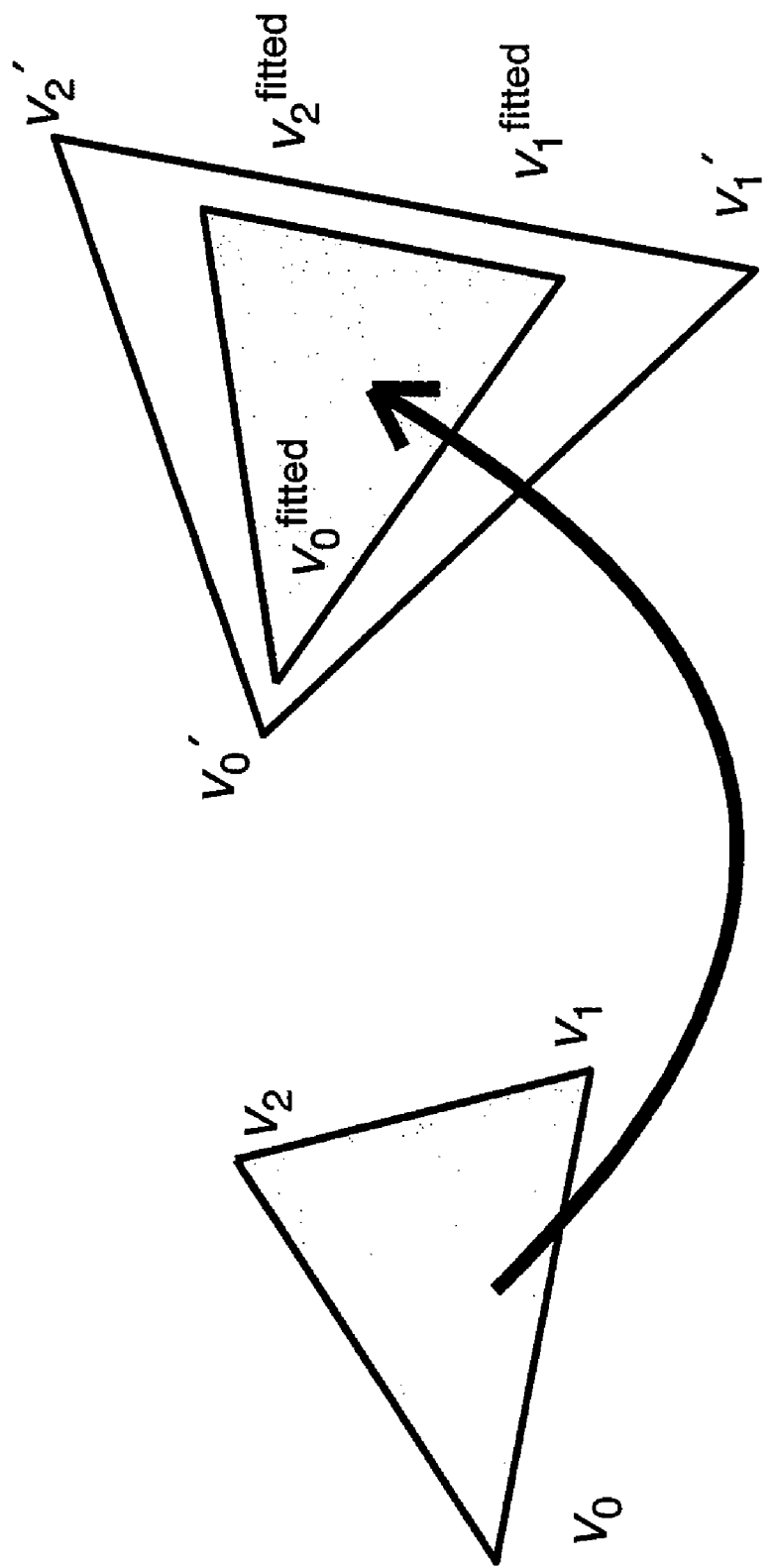
FIG. 6 is a diagram describing the fitting, which is a first step, in the processing by the second mesh creating section according to the embodiment.
Figure 7:
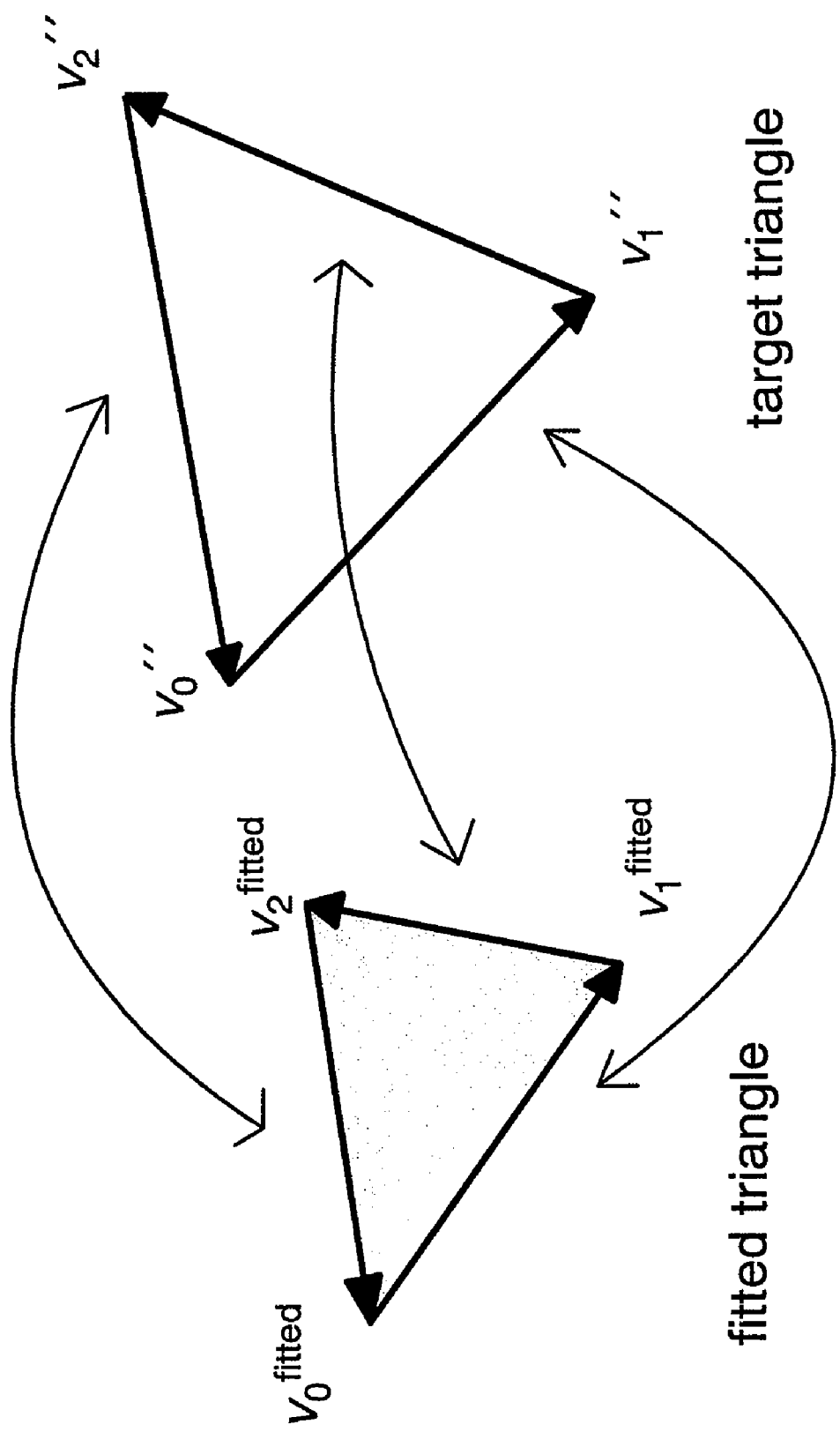
FIG. 7 is a diagram describing a second step in the processing by the second mesh creating section according to the embodiment.
Figure 8:
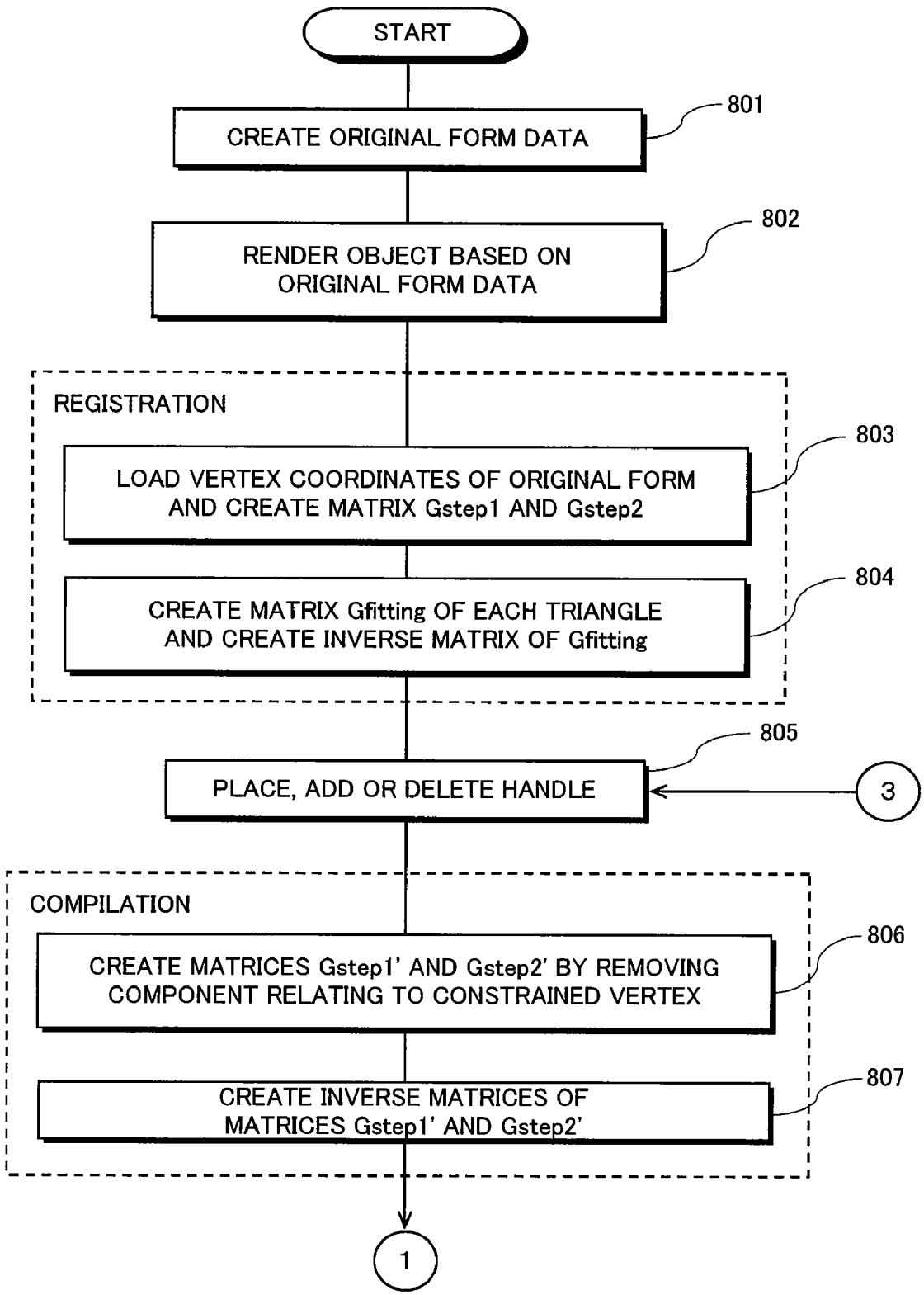
FIG. 8 is a flowchart showing processing to be performed in the image processing system 10 according to the embodiment.
Figure 9:
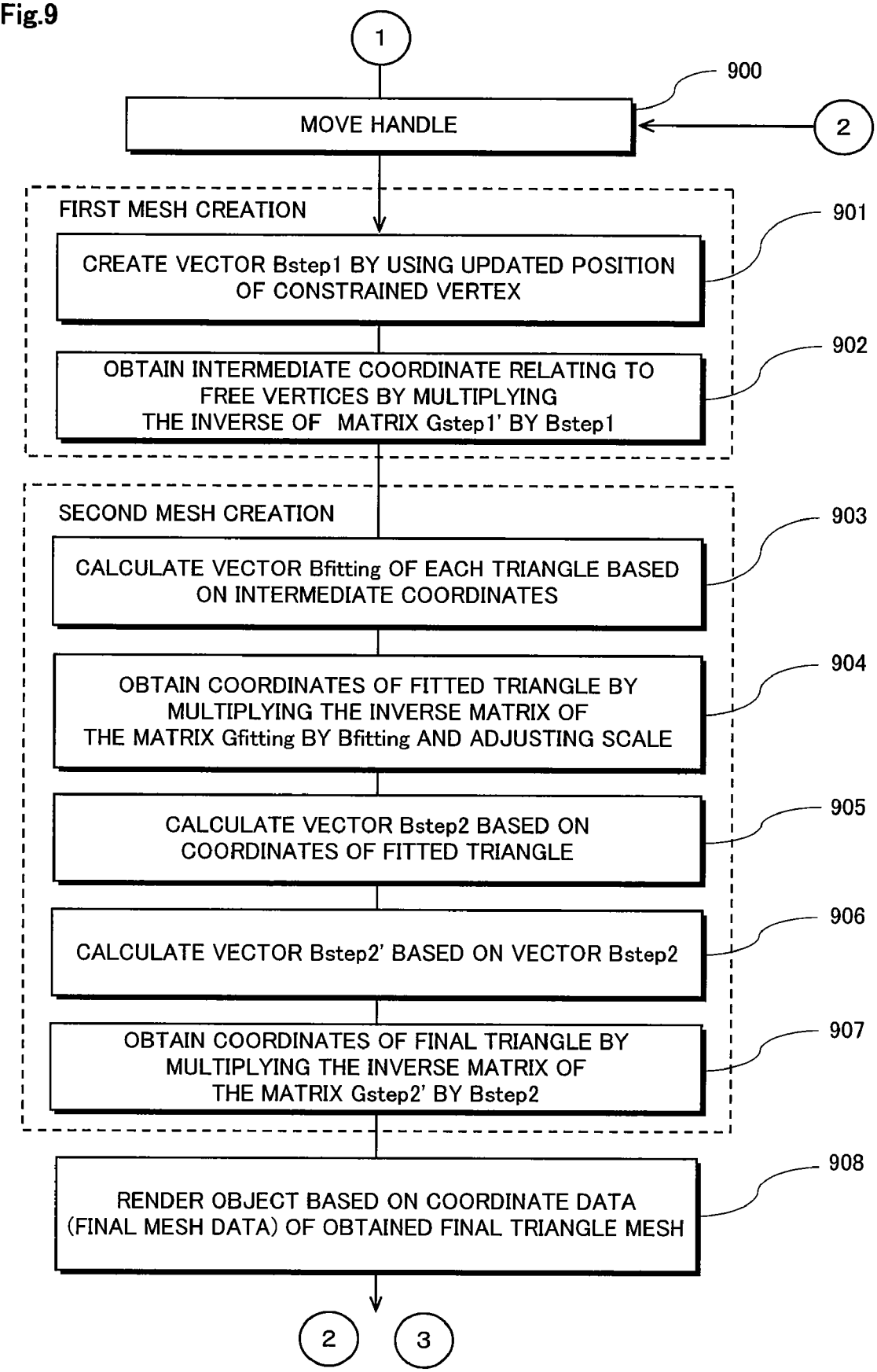
FIG. 9 is a flowchart showing processing to be performed in the image processing system 10 according to the embodiment.
Figure 10A:
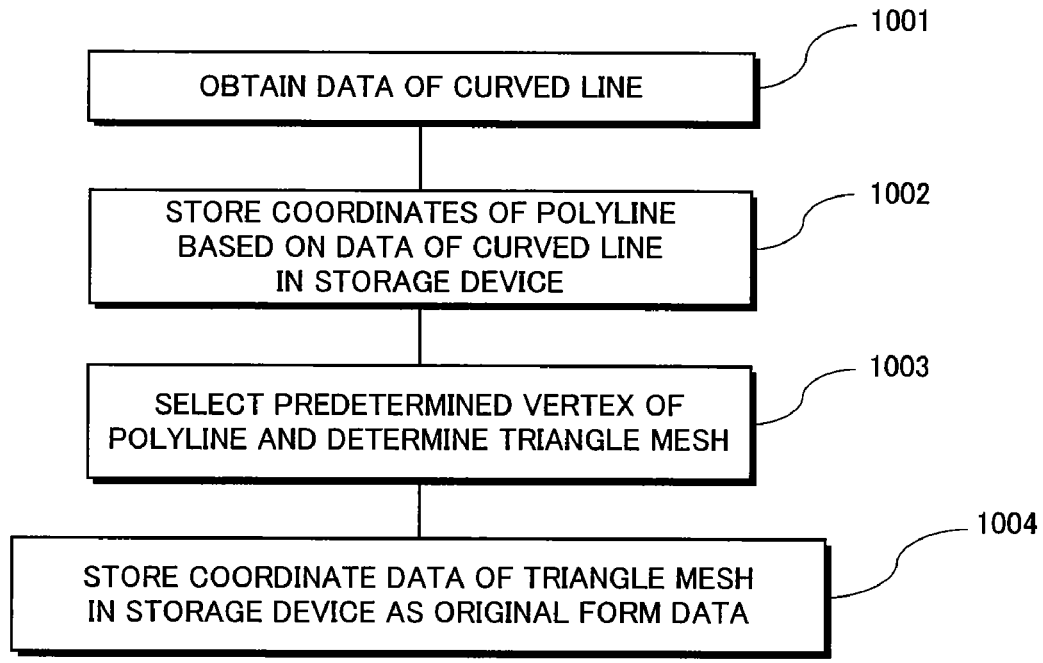
FIGS. 10A and 10B are flowcharts showing processing to be performed in the image processing system 10 when the invention is applied to the editing of a curved line.
Figure 10B:
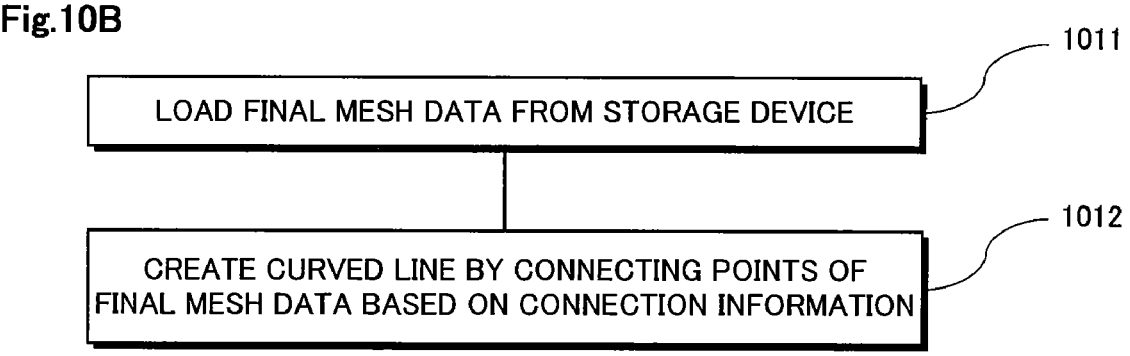
Figure 11:
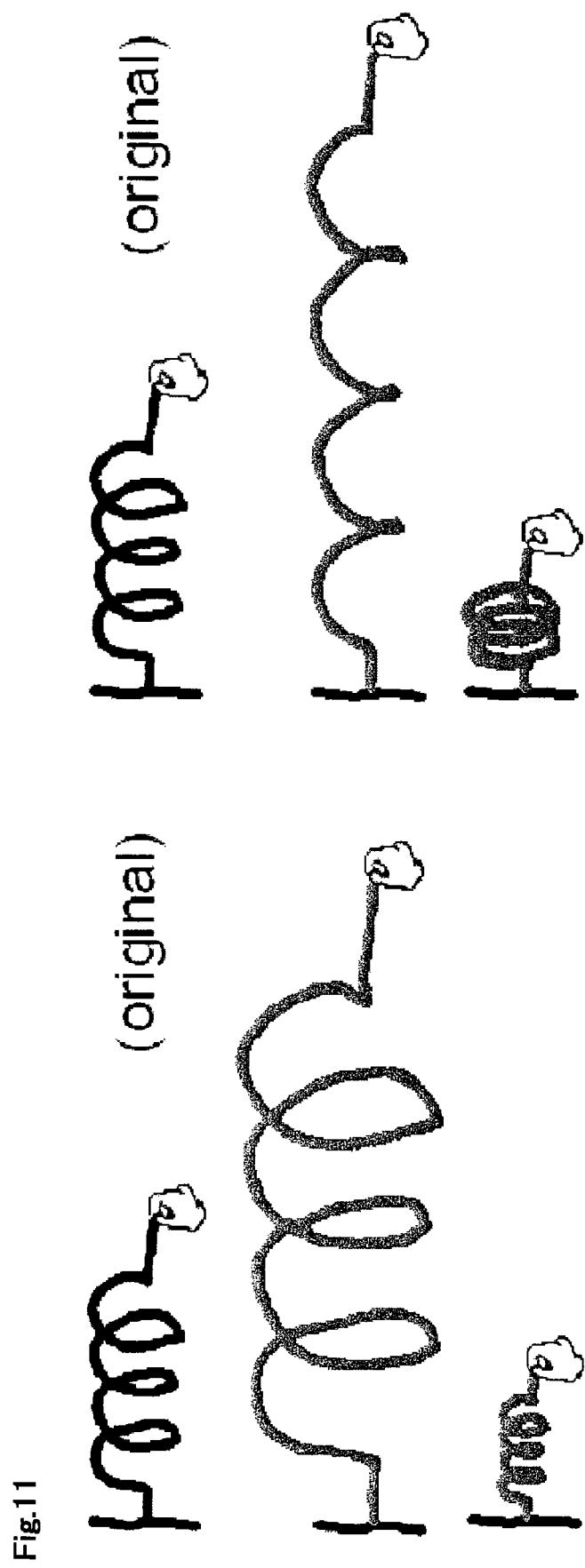
FIG. 11 is a diagram showing an example of the editing of a curved line by applying the invention.
Figure 12:
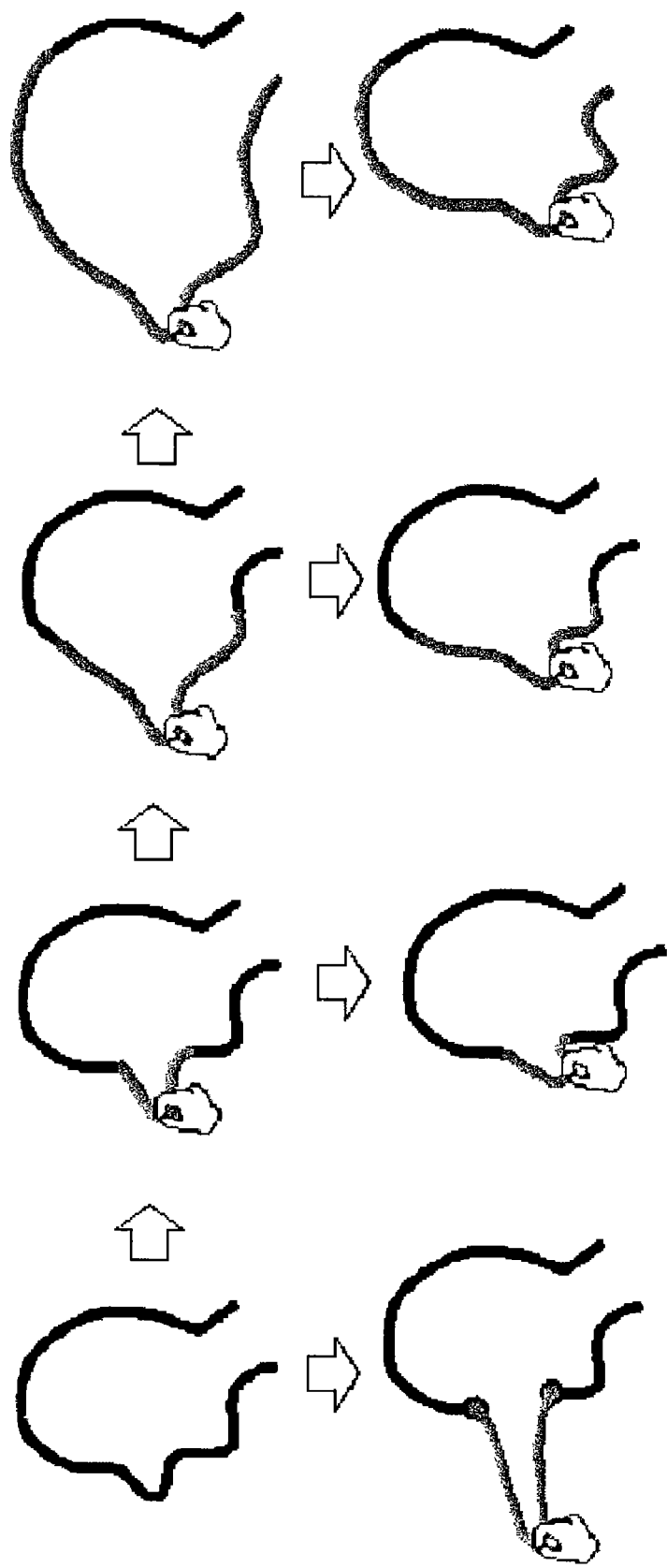
FIG. 12 is a diagram showing another example of the editing of a curved line by applying the invention.
Figure 13:
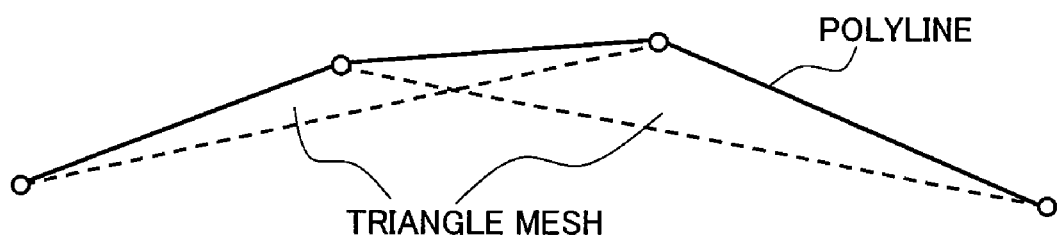
FIG. 13 is a diagram illustrating the creation of a triangle mesh when the invention is applied to the editing of a curved line.

10 Image Processing System
12 Input Device
14 Display device
30 Initial Mesh Creating Section
32 Registration Processing Section
34 Compilation Processing Section
36 First Mesh Creating Section
38 Second Mesh Creating Section
40 Storage Device
52 Image Creating Section

The invention claimed is:
1. An image processing system comprising:
 (a) a storage device that stores original form data including data of an original triangle mesh constructing an original object to be deformed;
 (b) first mesh creating means for loading original form data from the storage device, and for creating intermediate mesh data including data of an intermediate triangle mesh constructing an intermediate object based on information describing multiple handle positions including a fixed point and a moveable point on the triangle mesh of the original object from an input device, wherein the intermediate triangle mesh provides a minimum of a quadratic error metric expressing a difference between the original triangle mesh and a processed intermediate triangle mesh under a state allowing rotation, parallel movement and expansion/contraction of each triangle included in the original triangle mesh, and for storing the intermediate mesh data in the storage device; and
 (c) second mesh creating means for creating final mesh data including data of a final triangle mesh constructing a final object, and wherein the second mesh creating means also
  i. rotates and moves in parallel each triangle included in the original triangle mesh described by the original form data, and creates a fitted triangle data including data of fitted triangles, each of the fitted triangles providing a minimum of the quadratic error metric from a corresponding triangle included in the intermediate triangle mesh described by the intermediate mesh data under a state allowing rotation and parallel movement of each triangle included in the original triangle mesh, and the second mesh creating means stores the fitted triangle data in the storage device, and the second mesh creating means
  ii. creates final mesh data including data of the final triangle mesh that provides the minimum of the quadratic error metric expressing a difference in vector that expresses a side of a triangle between the fitted triangle described by the fitted triangle data and a corresponding triangle included in the final triangle mesh, and the second mesh creating means stores the final mesh data in the storage device.

2. The image processing system according to claim 1, further comprising:
 (d) image creating means for loading original form data or final mesh data stored in the storage device and creating an image including the object based on the loaded data.

3. The image processing system according to claim 1 further comprising:
 (d) registration means for, after original form data is stored in the storage device,
  i. calculating, based on the vertex coordinates of the original triangle mesh described by the original form data;
 a matrix $G^{step1}$ satisfying the relationship $$E^{step1}\{v\}=v^T G^{step1} v, \text{ and}$$

a matrix $G^{step2}$ satisfying the relationship $$E^{step2}\{v\}=v^T G^{step2} v,$$

wherein $E^{step1}$ is a function expressing the quadratic error metric in a first mesh creating means, wherein $E^{step1}$ is expressed by a quadratic expression by 2n variables $v0x$, $v0y$, $v1x$, $v1y$, ..., $vnx$, and $vny$, and $E^{step2}$ is a function expressing the quadratic error metric expressing the difference between the fitted triangle described by fitted triangle data and the corresponding triangle included in the final triangle mesh in the second mesh creating means, wherein $E^{step2}$ is expressed by a quadratic expression by 2n variables v0x, v0y, v1x, v1y, . . . , vnx, and vny, and
    ii. calculating
a matrix $G^{fitting}$ and the inverse matrix $G^{fitting-1}$ of the matrix $G^{fitting}$ satisfying the relationship $$\nabla E^{fitting}\{w\} = G^{fitting} w + B^{fitting} = 0,$$

wherein $E^{fitting}$ is a function expressing a quadratic error metric expressing the difference between the fitted triangle and the corresponding triangle included in an intermediate triangle mesh in the second mesh creating means; and
  (e) compilation means for, after a handle is placed or added at a position or deleted from a position in accordance with information from the input device,
    i. calculating
a matrix $G^{step1'}$ and a matrix $G^{step2'}$ by removing the component of the vertex constrained by the handle regarding the $G^{step1}$ and $G^{step2}$, and
    ii. calculating the inverse matrices $G^{step1'-1}$ and $G^{step2'-1}$ of the matrices $G^{step1'}$ and $G^{step2'}$.

4. The image processing system according to claim 3, wherein, after the handle at the position is moved in accordance with information from the input device,
the first mesh creating means
calculates a vector $B^{step1}$ by using the updated position of the vertex constrained in a triangle mesh accompanying with the movement of the handle, wherein $\nabla E^{step1}\{u\} = G^{step1'} + B^{step1} = 0$ and $\nabla E^{step1}\{v\}$ is a partial differential of $E^{step1}\{v\} = v^T G^{step1} v$; and then the first mesh creating means multiplies the matrix $G^{step1'-1}$ by the $B^{step1}$ to create intermediate mesh data of the intermediate mesh triangle including the coordinates relating to a free vertex in a triangle mesh; and
  the second mesh creating means
calculates the vector $B^{fitting}$ based on the intermediate mesh data, and
multiplies the matrix $G^{fitting-1}$ by $B^{fitting}$ to create the fitted triangle data of the fitted triangles, wherein the second mesh creating means also
calculates a vector $B^{step2'}$ based on the fitted triangle data, wherein $\nabla E^{step2}\{u\} = G^{step2'} u + B^{step2'} = 0$, and $\nabla E^{step2}\{v\}$ is a partial differential of $E^{step2}\{v\} = v^T G^{step2} v$ $\alpha B^{step2} v$ and
    wherein the second mesh creating means multiplies the matrix $G^{step2'-1}$ by $B^{step2'}$ to create the final mesh data of the final triangle mesh.

5. The image processing system according to claim 1, wherein the original object to be deformed is a two-dimensional object.

6. The image processing system according to claim 1, further comprising:
  (d) initial triangle mesh creating means for creating a triangle mesh formed by connecting three neighboring points of the vertices based on data of a polyline expressing the curved line, and for storing the data of the created triangle mesh in the storage device as the data of the original triangle mesh of the original form data.

7. A computer-readable medium comprising an image processing program readable by a computer operably connected to a storage device storing original form data including data of an originals triangle mesh constructing an original object to be deformed, wherein the program causes the computer to perform:

(a) a first mesh creating step that includes
    i. loading the original form data from the storage device;
    ii. creating intermediate mesh data including data of an intermediate triangle mesh constructing an intermediate object based on information describing multiple handle positions including a fixed point and a moveable point on the triangle mesh of the original object from an input device, wherein the intermediate triangle mesh provides a minimum of a quadratic error metric expressing a difference between the original triangle mesh and a processed intermediate triangle mesh under a state allowing rotation, parallel movement and expansion/contraction of each triangle included in the original triangle mesh; and
    iii. storing the intermediate mesh data in the storage device; and
  (b) a second mesh creating step that includes
    i. rotating and moving in parallel each triangle included in the original triangle mesh described by the original form data;
    ii. creating a fitted triangle data including data of fitted triangles, wherein each of the fitted triangles provides the minimum of the quadratic error metric from a corresponding triangle included in the intermediate triangle mesh described by the intermediate mesh data under a state allowing rotation and parallel movement of each triangle included in the original triangle mesh, and storing the fitted mesh data in the storage device;
    iii. creating final mesh data including data of a final triangle mesh constructing a final object, wherein creation of the final mesh data provides the minimum of the quadratic error metric expressing the difference in vector that expresses a side of a triangle between the fitted triangle described by the fitted triangle data and a corresponding triangle included in the final triangle mesh; and
    iv. storing the final mesh data in the storage device.

8. A computer-readable medium comprising the image processing program according to claim 7, further causing the computer to perform
  (c) an image creating step that includes loading original form data or final mesh data stored in the storage device and creating the image including the object based on the loaded data.

9. A computer-readable medium comprising the image processing program according to claim 7, further causing the computer to perform the steps of:
  (c) after original form data is stored in the storage device,
    i. calculating, based on vertex coordinates of the original triangle mesh described by the original form data,
  a matrix $G^{step1}$ satisfying the relationship $$E^{step1}\{v\} = v^T G^{step1} v,$$

and a matrix $G^{step2}$ satisfying the relationship $$E^{step2}\{v\} = v^T G^{step2} v,$$

wherein $E^{step1}$ is a function expressing the quadratic error metric in a first mesh creating means, wherein $E^{step1}$ is expressed by a quadratic expression by 2n variables v0x, v0y, v1x, v1y, . . . vnx, and vny, and $E^{step2}$ is a function expressing the quadratic error metric expressing the difference between the fitted triangle described by fitted triangle data and the corresponding triangle included in the final triangle mesh in a second mesh creating means, wherein $E^{step2}$ is expressed by a quadratic expression by 2n variables v0x, v0y, v1x, v1y, vnx, ... and vny; and (b) ii. calculating
a matrix $G^{fitting}$ and the inverse matrix $G^{fitting-1}$ of the matrix $G^{fitting}$ satisfying the relationship $$\nabla E^{fitting}\{w\} = G^{fitting}w + B^{fitting} = 0$$

wherein $E^{fitting}$ is a function expressing a quadratic error metric expressing the difference between the fitted triangle and the corresponding triangle included in an intermediate triangle mesh in the second mesh creating means; and (d) after a handle is placed or added at a position or deleted from a position in accordance with information from the input device,
   i. calculating
a matrix $G^{step1'}$ and a matrix $G^{step2'}$ by removing the component of the vertex constrained by the handle regarding the $G^{step1}$ and $G^{step2}$; and
   ii. calculating the inverse matrices $G^{step1'-1}$ and $G^{step2'-1}$ of the matrices $G^{step1'}$ and $G^{step2'}$.

10. The image processing program according to claim 9, wherein, after the handle at the position is moved in accordance with information from the input device,
the program causes the computer to perform, in the first mesh creating step (a), the additional steps of:
   iv. calculating a vector $B^{step1}$ by using the updated position of the vertex constrained on a triangle mesh accompanying with the movement of the handle, wherein $\nabla E^{step1}\{u\} = G^{step1'}+B^{step1}=0$, and $\nabla E^{step1}\{v\}$ is partial differential of $E^{step1}\{v\} = v^T G^{step1} v$; and
   v. multiplying the matrix $G^{step1'-1}$ by the $B^{step1}$ to create intermediate mesh data of the intermediate mesh triangle including the coordinates relating to a free vertex in a triangle mesh; and
the program causes the computer to perform, in the second mesh creating step (b), the additional steps of:
   v. calculating the vector $B^{fitting}$ based on the intermediate mesh data;
   vi. multiplying the matrix $G^{fitting-1}$ by $B^{fitting}$ to create the fitted triangle data of the fitted triangles;
   vii. calculating a vector $B^{step2'}$ based on the fitted triangles data, wherein $\nabla E^{step2}\{u\} = G^{step2'}u + B^{step2'}=0$, and $\nabla E^{step2}\{v\}$ is a partial differential of $E^{step2}\{v\} = v^T G^{step2} v + B^{step2} v$; and
   viii. multiplying the matrix $G^{step2'-1}$ by $B^{step2'}$ to create the final mesh data of the final triangle mesh.

11. A computer-readable medium according to claim 7, wherein the original object to be deformed is a two-dimensional.

12. A computer-readable medium according to claim 7, wherein the program further causes the computer to perform
   (c) an initial triangle mesh creating step that includes creating a triangle mesh formed by connecting three neighboring points of the vertices based on data of a polyline expressing a curved line and storing the data of the created triangle mesh in the storage device as the data of the original triangle mesh of the original form data.

13. A method of image processing, comprising the steps of:
(a) providing a storage device that stores original form data including data of an original triangle mesh constructing an original object to be deformed;
(b) loading the original form data from the storage device based on information;
(c) creating intermediate mesh data including data of an intermediate triangle mesh constructing an intermediate object based on information describing multiple handle positions including a fixed point and a moveable point on the triangle mesh of the original object from an input device, wherein the intermediate triangle mesh provides a minimum of a quadratic error metric expressing a difference between the original triangle mesh and a processed intermediate triangle mesh under a state allowing rotation, parallel movement and expansion/contraction of each triangle included in the original triangle mesh;
(d) storing the intermediate mesh data in the storage device;
(e) rotating and moving in parallel each triangle included in the original triangle mesh described by the original form data;
(f) creating a fitted triangle data including data of fitted triangles, wherein each of the fitted triangles provides the minimum of the quadratic error metric from a corresponding triangle included in the intermediate triangle mesh described by the intermediate mesh data under a state allowing rotation and parallel movement of each triangle included in the original triangle mesh, and storing the fitted mesh data in the storage device;
(g) creating final mesh data including data of a final triangle mesh constructing a final object, wherein creation of the final mesh data provides the minimum of the quadratic error metric expressing the difference in vector that expresses a side of a triangle between the fitted triangle described by the fitted triangle data and a corresponding triangle included in the final triangle mesh; and
(h) storing the final mesh data in the storage device.

14. An image processing system comprising:
(a) a storage device that stores original form data including data of a triangle mesh constructing an object to be deformed;
(b) first mesh creating means for loading original form data from the storage device based on information describing multiple handle positions including a fixed point and a movable point on the triangle mesh on an image from an input device, and for creating intermediate mesh data including data of an intermediate triangle mesh that provides a minimum of a quadratic error metric expressing a difference between the original triangle mesh and a processed intermediate triangle mesh under a state allowing rotation and expansion/contraction of the original triangle mesh described by the original form data, and for storing the intermediate mesh data in the storage device;
(c) second mesh creating means for creating final mesh data including data of a final triangle mesh that provides the minimum of an error metric expressing a difference between the intermediate triangle mesh and the final triangle mesh under a state allowing rotation and parallel movement of the intermediate triangle mesh described by the intermediate mesh data and not allowing uneven distortion, expansion/contraction and scale-up/down;
(d) registration means for, after original form data is stored in the storage device,
   i. calculating, based on the vertex coordinates of the original triangle mesh described by the original form data, a matrix $G^{step1}$ satisfying the relationship $$E^{step1}\{v\} = v^T G^{step1} v, \text{ and}$$

a matrix $G^{step2}$ satisfying the relationship $$E^{step2}\{v\} = v^T G^{step2} v,$$

wherein $E^{step1}$ is a function expressing the quadratic error metric in the first mesh creating means, wherein $E^{step1}$ is expressed by a quadratic expression by 2n variables v0x, v0y, v1x, v1y, ... vnx, and vny, and $E^{step2}$ is a function expressing the quadratic error metric expressing the difference between the triangle mesh described by fitted mesh data and the final triangle mesh in the second mesh creating means, wherein $E^{step2}$ is expressed by a quadratic expression by 2n variables v0x, v0y, v1x, v1y, ... vnx, and vny, and ii. calculating a matrix $G^{fitting}$ and the inverse matrix $G^{fitting-1}$ of the matrix $G^{fitting}$ satisfying the relationship $$\nabla E^{fitting}\{w\} = G^{fitting}w + B^{fitting} = 0,$$

wherein $E^{fitting}$ is a function expressing a quadratic error metric expressing the difference between the triangle mesh described by the original form data and an intermediate triangle mesh in the second mesh creating means; and (e) compilation means for, after a handle is placed or added at a position or deleted from a position in accordance with information from the input device,
    i. calculating a matrix $G^{step1'}$ and a matrix $G^{step2'}$ by removing the component of the vertex constrained by the handle regarding the $G^{step1}$ and $G^{step2}$, and
    ii. calculating the inverse matrices $G^{step1'-1}$ and $G^{step2'-1}$ of the matrices $G^{step1'}$ and $G^{step2'}$, wherein the second mesh creating means rotates and moves in parallel the original triangle mesh described by the original form data, and creates a fitted mesh data including data of a fitted triangle mesh that provides the minimum of the quadratic error metric from the corresponding intermediate triangle mesh described by the intermediate mesh data, and the second mesh creating means stores the fitted mesh data in the storage device, and the second mesh creating means creates the final mesh data including data of a final triangle mesh that provides the minimum of the quadratic error metric expressing a difference in vector that expresses a side of a triangle between the triangle mesh described by the fitted mesh data and the corresponding final triangle mesh, and the second mesh creating means stores the final mesh data in the storage device.

15. A computer-readable medium comprising an image processing program readable by a computer operably connected to a storage device storing original form data including data of a triangle mesh constructing an object to be deformed, wherein the program causes the computer to perform:

(a) a first mesh creating step that includes
    i. loading the original form data from the storage device based on information describing multiple handle positions including a fixed point and a movable point on the triangle mesh on an image from an input device;
    ii. creating intermediate mesh data including data of an intermediate triangle mesh that provides a minimum of a quadratic error metric expressing a difference between the original triangle mesh and a processed intermediate triangle mesh under a state allowing rotation and expansion/contraction of the original triangle mesh described by the original form data; and
    iii. storing the intermediate mesh data in the storage device; and (b) a second mesh creating step that includes
    i. creating final mesh data including data of a final triangle mesh that provides a minimum of an error metric expressing a difference between the intermediate triangle mesh and the final triangle mesh under a state allowing rotation and parallel movement of the intermediate triangle mesh described by the intermediate mesh data and not allowing uneven distortion, expansion/contraction and scale-up/down, wherein the final mesh data is created by
      1. rotating and moving in parallel the original triangle mesh described by the original form data;
      2. creating a fitted mesh data including data of a fitted triangle mesh that provides the minimum of the quadratic error metric from the corresponding intermediate triangle mesh described by the intermediate mesh data, and storing the fitted mesh data in the storage device; and
      3. creating the final mesh data including data of the final triangle mesh that provides the minimum of the quadratic error metric expressing a difference in vector that expresses a side of a triangle between the triangle mesh described by the fitted mesh data and a corresponding final triangle mesh, and storing the final mesh data in the storage device; and
    ii. storing the final mesh data in the storage device;

(c) after original form data is stored in the storage device,
    i. calculating, based on vertex coordinates of the original triangle mesh described by the original form data, a matrix $G^{step1}$ satisfying the relationship $$E^{step1}\{v\} = v^T G^{step1} v,$$

and a matrix $G^{step2}$ satisfying the relationship $$E^{step2}\{v\} = v^T G^{step2} v,$$

wherein $E^{step1}$ is a function expressing the quadratic error metric in a first mesh creating means, wherein $E^{step1}$ is expressed by a quadratic expression by 2n variables v0x, v0y, v1x, v1y, ..., vnx, and vny, and $E^{step2}$ is a function expressing the quadratic error metric expressing the difference between the triangle mesh described by fitted mesh data and the final triangle mesh in a second mesh creating means, wherein $E^{step2}$ is expressed by a quadratic expression by 2n variables v0x, v0y, v1x, v1y, ..., vnx, and vny; and
    ii. calculating a matrix $G^{fitting}$ and the inverse matrix $G^{fitting-1}$ of the matrix $G^{fitting}$ satisfying the relationship $$\nabla E^{fitting}\{w\} = G^{fitting}w + B^{fitting} = 0,$$

wherein $E^{fitting}$ is a function expressing a quadratic error metric expressing the difference between the triangle mesh described by the original form data and an intermediate triangle mesh in the second mesh creating means; and (d) after a handle is placed or added at a position or deleted from a position in accordance with information from the input device,
    i. calculating a matrix $G^{step1'}$ and a matrix $G^{step2'}$ by removing the component of the vertex constrained by the handle regarding the $G^{step1}$ and $G^{step2}$; and
    ii. calculating the inverse matrices $G^{step1'-1}$ and $G^{step2'-1}$ of the matrices $G^{step1'}$ and $G^{step2'}$.

\* \* \* \* \*